(12) United States Patent
Yoo et al.

(10) Patent No.: US 12,717,055 B2
(45) Date of Patent: Aug. 25, 2026

(54) BANDWIDTH EXTENSION VIA DEEP NEURAL NETWORKS TRAINED ON SYNTHETIC SEISMIC DATASETS

(71) Applicant: SAUDI ARABIAN OIL COMPANY, Dhahran (SA)

(72) Inventors: Jewoo Yoo, Delft (NL); Paul M. Zwartjes, Wassenaar (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 577 days.

(21) Appl. No.: 18/191,183

(22) Filed: Mar. 28, 2023

(65) Prior Publication Data

US 2024/0329264 A1 Oct. 3, 2024

(51) Int. Cl.

| | |
|---|---|
| ***G01V 1/28*** | (2006.01) |
| ***E21B 7/04*** | (2006.01) |
| ***G01V 1/30*** | (2006.01) |

(52) U.S. Cl.

CPC ................ *G01V 1/282* (2013.01); *E21B 7/04* (2013.01); *G01V 1/302* (2013.01); *G01V 2210/52* (2013.01); *G01V 2210/614* (2013.01); *G01V 2210/67* (2013.01)

(58) Field of Classification Search

None

See application file for complete search history.

(56) References Cited

U.S. PATENT DOCUMENTS

| | | | | |
|---|---|---|---|---|
| 10,191,168 | B2 | 1/2019 | Peng et al. | |
| 2019/0383965 | A1* | 12/2019 | Salman | G01V 1/36 |
| 2020/0183035 | A1* | 6/2020 | Liu | G06N 20/00 |
| 2021/0215841 | A1 | 7/2021 | Aharchaou et al. | |
| 2021/0318458 | A1* | 10/2021 | Baumstein | G01V 1/36 |
| 2023/0408327 | A1* | 12/2023 | Fu | G01V 1/307 |

OTHER PUBLICATIONS

Yuan, Z., Jiang, et al., "Improving Seismic Resolution by a Sequential Convolutional Neural Network," 82nd EAGE Annual Conference & Exhibition, 2021 (6 pages).

(Continued)

*Primary Examiner* — Raymond L Nimox

(74) *Attorney, Agent, or Firm* — Osha Bergman Watanabe & Burton LLP

(57) ABSTRACT

A method to extend the bandwidth of seismic data. The method includes collecting a seismic dataset from a seismic survey conducted over a subterranean region of interest and generating a plurality of synthetic datasets, where each synthetic dataset comprises an input seismic dataset with a first bandwidth and an associated target seismic dataset with a second bandwidth. The second bandwidth is broader than the first bandwidth. Further, each synthetic dataset is generated directly in a time domain and includes an event, where the event includes a geometric shape and a wavelet. The method further includes splitting the plurality of synthetic datasets into a training set, selecting a machine-learned model, training the machine-learned model using the training set, and using the machine-learned model to produce an extended bandwidth seismic dataset from the seismic dataset. The method further includes determining a location of a hydrocarbon reservoir using the extended bandwidth seismic dataset.

11 Claims, 17 Drawing Sheets

(56) References Cited

OTHER PUBLICATIONS

Ronneberger, O., et al.," U-Net: Convolutional Networks for Biomedical Image Segmentation," Medical Image Computing and Computer-Assisted Intervention, Lecture Notes in Computer Science, 2015 (8 pages).
Liang, C., et al., "Tutorial: Spectral bandwidth extension—Invention versus harmonic extrapolation," Geophysics 82, 2017 (65 pages).
Kingma, D. P., et al., "Adam: A method for stochastic optimization," International Conference on Learning Representations (ICLR), 2015 (15 pages).
Choi, Yonggyu, et al., "Vertical resolution enhancement of seismic data with convolutional U-net," SEG International Exposition and 89th Annual Meeting, 2019 (5 pages).
Halpert, A.D., et al., "Deep learning-enabled seismic image enhancement," SEG International Exposition and 88th Annual Meeting, 2018 (5 pages).
Li, Jintao, et al., "Deep learning for simultaneous seismic image super-resolution and denoising," Society of Exploration and Geophysicists, 2020 (5 pages).
Smith, Michael, et al., "Extending seismic bandwidth using the continuous wavelet transform," First Break, vol. 26, 2008 (6 pages).
J. Zhang, et al., "Well-Controlled Seismic Resolution Improvement: A Machine Learning Approach," 82nd Annual EAGE Conference & Exhibition, 2021 (5 pages).
Zwartjes, P., et al., "Robust high frequency seismic bandwidth extension with a deep neural network trained using synthetic data," Artificial Intelligence in Geosciences, 2024 (18 pages).
O. Ovcharenko et al., "Multi-Task Learning for Low-Frequency Extrapolation and Elastic Model Building from Seismic Data," IEEE Transactions on Geoscience and Remote Sensing, vol. 60, 2022 (17 pages).
Non-Final Office Action issued by the U.S. Patent Office for corresponding U.S. Appl. No. 18/191,193, mailed Jul. 22, 2025 (32 pages).

* cited by examiner 400
402
405
414
412
410
408
404
406
1

BANDWIDTH EXTENSION VIA DEEP NEURAL NETWORKS TRAINED ON SYNTHETIC SEISMIC DATASETS

BACKGROUND

To understand and model a subterranean region of interest, especially in the field of oil and gas exploration, seismic experiments and/or surveys are often conducted. In a seismic survey, energy is emitted from a source, where the source is often on the surface of the Earth, into the subterranean region of interest. The emitted energy propagates as a wavefield through the subterranean region of interest and a portion of the propagating energy is reflected at geological interfaces joining regions of the subsurface with differing lithostratigraphic properties (i.e., regions of different rock types). Eventually, reflected wavefields return to the surface of the Earth and the amplitudes of these wavefields are recorded with respect to time by one or more seismic receivers. The collection of recorded amplitudes in time over one or more seismic receivers may be considered a seismic dataset. A seismic dataset may be organized, pre-processed, and visualized as a seismic image. A seismic dataset (or seismic image) depicts subsurface reflectors, or geological interfaces, indicating changes in acoustic properties that usually coincide with changes in lithology in the subterranean region of interest. In practice, a seismic dataset does not depict the subsurface reflectors with a sharp contrast (i.e., a distinct interface) but as a wavelet with sidelobes (oscillations). The primary cause of this phenomenon in the seismic dataset is that the initial source wavefield and the recorded reflections have a limited temporal frequency bandwidth (or, more simply, bandwidth).

In order to interpret subtle geological features, thin beds, or subsurface reflectors oriented to form a wedge in the subterranean region of interest, it is necessary to increase the bandwidth. In simplified terms, increased bandwidth results in higher resolution seismic datasets. That is, subsurface reflectors, and other geological features of the subsurface, are better resolved with higher bandwidth. Accordingly, to better model a subterranean region of interest there exists a need to increase the bandwidth of acquired seismic datasets.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method that includes collecting a seismic dataset from a seismic survey conducted over a subterranean region of interest, generating a plurality of synthetic datasets, splitting the plurality of synthetic datasets into a training set, selecting a first machine-learned model with a first architecture, training the first machine-learned model using the training set, wherein the first machine-learned model is trained to receive the seismic dataset and output another seismic dataset with extended bandwidth relative to the seismic dataset. The method further includes using the first machine-learned model to produce an extended bandwidth seismic dataset from the seismic dataset and determining a location of a hydrocarbon reservoir in the subterranean region of interest using the extended bandwidth seismic dataset. In one or more embodiments, each synthetic dataset includes an input seismic dataset with a first bandwidth and an associated target seismic dataset with a second bandwidth, where the second bandwidth is broader than the first bandwidth. Further, each synthetic dataset is generated directly in a time domain and includes an event, where the event includes a geometric shape and a wavelet;

Embodiments disclosed herein generally relate to a system that includes a trained machine-learned model where the machine-learned model is trained to receive a seismic dataset and output another seismic dataset with extended bandwidth relative to the seismic dataset and a computer. The computer is configured to receive the seismic dataset, use the trained machine-learned model to produce an extended bandwidth seismic dataset from the seismic dataset, and construct a wellbore plan using the extended bandwidth seismic dataset.

Embodiments disclosed herein generally relate to a computer-implemented method of training a machine-learned model that includes generating a plurality of synthetic datasets, where each synthetic dataset is generated directly in a time domain including an event and where the event includes a geometric shape and a wavelet. Each synthetic dataset includes an input seismic dataset with a first bandwidth and an associated target seismic dataset with a second bandwidth where the second bandwidth is broader than the first bandwidth. The method further includes splitting the plurality of synthetic datasets into a training set, selecting the machine-learned model type and architecture, training the machine-learned model using the training set, where the machine-learned model is trained to receive a seismic dataset and output another seismic dataset with extended bandwidth relative to the seismic dataset.

Other aspects and advantages of the claimed subject matter will be apparent from the following description and the appended claims.

DETAILED DESCRIPTION

Figure 1:
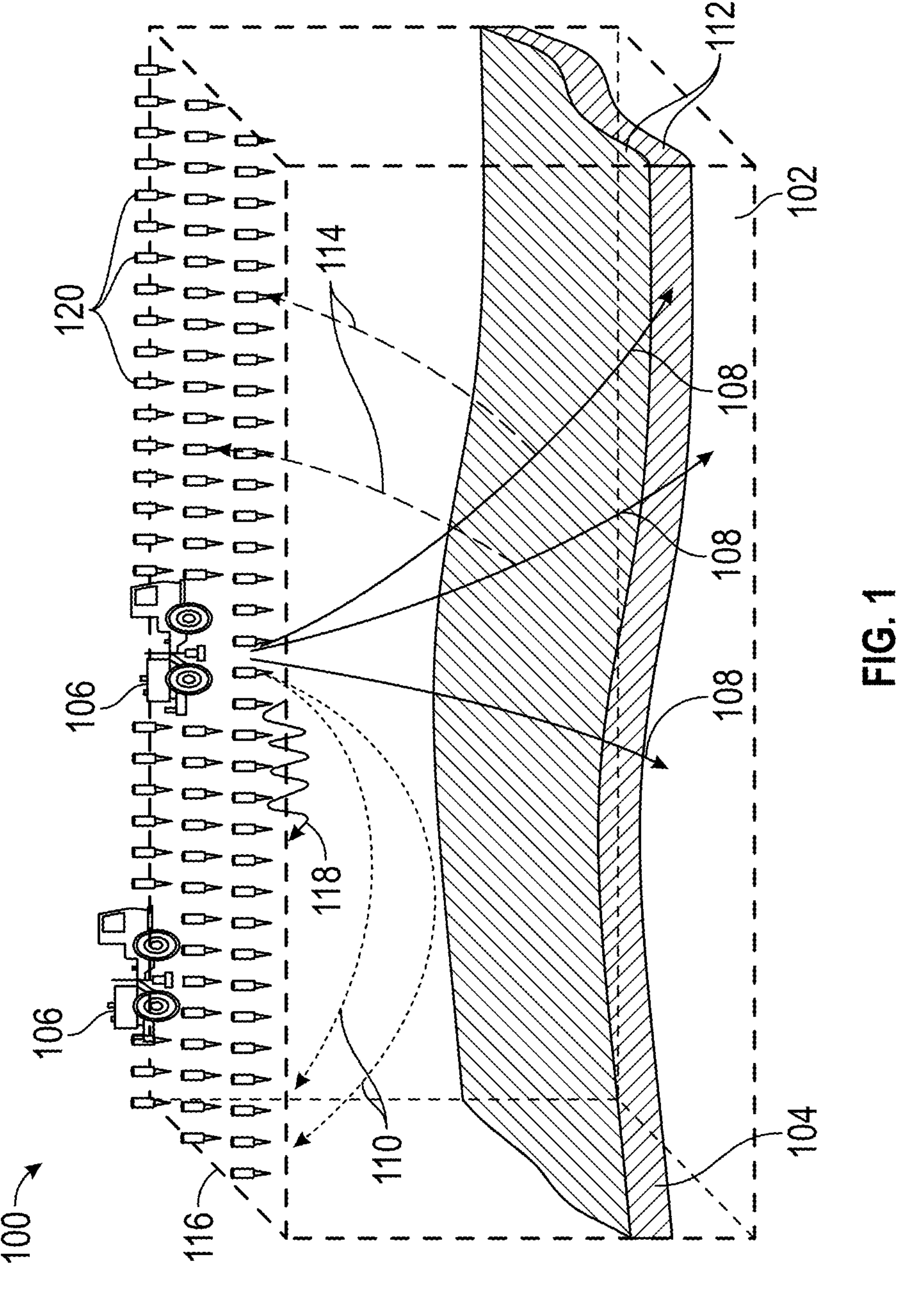
FIG. 1 depicts a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-17, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108) (i.e., emitted energy, wavefield). The type of seismic source (106) may depend on the environment in which it is used, for example on land the seismic source (106) may be a vibroseis truck or an explosive charge, but in water the seismic source (106) may be an airgun. The radiated seismic waves (108) may return to the surface of the Earth (116) as refracted seismic waves (110) or may be reflected by geological discontinuities (112) (interfaces between subsurface regions with differing lithostratigraphic properties) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the surface of the Earth (116) and hence are not influenced, nor contain information about, portions of the subterranean region of interest (102) where hydrocarbon reservoirs (104) are typically located. Seismic receivers (120) located on or near the surface of the earth (116) detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discrete sample times. Usually the origin of the time-series, denoted $t=0$, is determined by the activation time of the seismic source (106). This time-series may be denoted a seismic "trace". The seismic receivers (120) are positioned at a plurality of seismic receiver locations which we may denote with $(x_r, y_r)$, where x and y represent orthogonal axes on the surface of the Earth (116) above the subterranean region of interest (102). Thus, the plurality of seismic traces generated by activations of the seismic source (106) at a single location may be represented as a three-dimensional "3D" volume with axes $(x_r, y_r, t)$ where $(x_r, y_r)$ represents the location of the seismic receiver (120) and t denotes the time sample at which the amplitude of ground-motion was measured. The collection of seismic traces is herein referred to as a seismic dataset.

However, a seismic survey (100) may include recordings of seismic waves generated by a seismic source (106) sequentially activated at a plurality of seismic source locations denoted ($x_s$, $y_s$). In some cases, a single seismic source (106) may be activated sequentially at each source location. In other cases, a plurality of seismic sources (106) each positioned at a different location may be activated sequentially. In accordance with one or more embodiments a plurality of seismic sources (106) may be activated during the same time period, or during overlapping time periods.

Once acquired, a seismic dataset may undergo a myriad of pre-processing steps. These pre-processing steps may include, but are not limited to: reducing signal noise; applying move-out corrections; organizing or resampling the traces according to a regular spatial pattern (i.e., regularization); and data visualization. One with ordinary skill in the art will recognize that many pre-processing (or processing) steps exist for dealing with a seismic dataset. As such, one with ordinary skill in the art will appreciate that not all pre-processing (or processing) steps can be enumerated herein and that zero or more pre-processing (or processing) steps may be applied with the methods disclosed herein without imposing a limitation on the instant disclosure.

Figure 2:
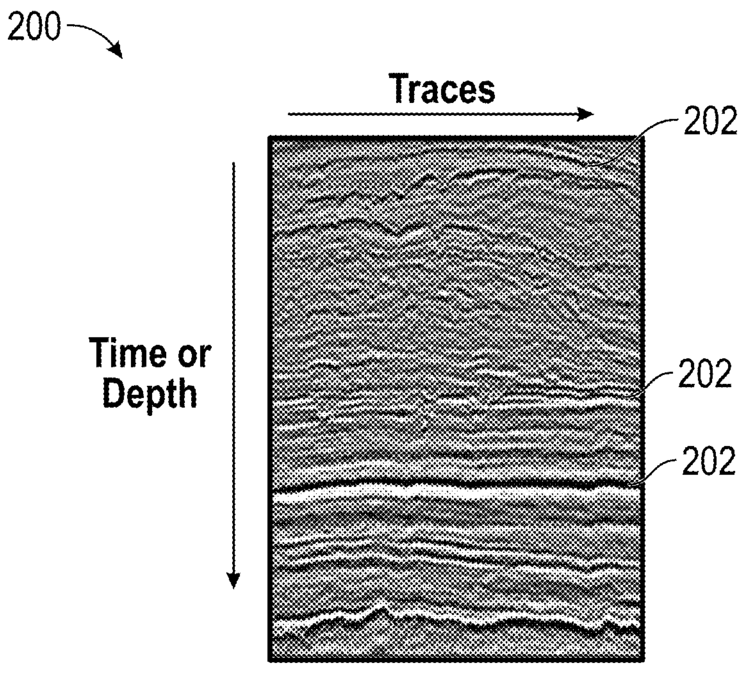
FIG. 2 depicts a seismic dataset in accordance with one or more embodiments.

FIG. 2 displays an example seismic dataset (200). The example seismic dataset (200) is shown as a seismic image where traces, indicating the amplitude of ground-motion recorded in time, are arranged as columns and adjoined according to a spatial location on the surface of the Earth (116). In accordance with one or more embodiments, the time axis of the traces may be converted to depth using one or more time-depth migration processes. Many geological interfaces (202), or discontinuities, may be seen in FIG. 2. To prevent FIG. 2 from becoming cluttered only a few geological interfaces (202) are indicated with a reference line. Close examination of the geological interfaces (202) of FIG. 2 reveals that these geological interfaces (202) do not appear as sharp step-like features. Further, when visualized as a seismic image as in FIG. 2, the geological interfaces (202) appear fuzzy or oscillatory in nature. The geological interfaces (202) correspond to changes in acoustic properties that usually coincide with changes in lithology in the subterranean region of interest (102). A consequence of fuzzy and/or oscillatory nature of the geological interfaces (202), as seen, for example, in the example seismic dataset (200), is that the lithology and location of geological units in the subterranean region of interest (102) are not well resolved. In fact, thin geological units and other subtle geological features may not be detected without increased resolution of the seismic dataset. The primary limitation on the resolution of a seismic dataset stems from the fact that the initial source wavefield and the recorded reflections have a limited temporal frequency bandwidth (or, more simply, bandwidth). Generally, the bandwidth associated with a seismic survey is typically between 5 and 50 Hz, corresponding to a typical wavelength of between 1,640 feet (250 m) and 164 feet (25 m). Therefore, to interpret subtle geological features and thin geological units, among other things, it is necessary to increase the bandwidth of a seismic dataset. It is noted that while FIG. 2 demonstrates a 2D example seismic dataset (200), this does not constitute a constraint on the dimensionality of a seismic dataset. In general, a seismic dataset may be 2D or 3D without departing from the scope of this disclosure.

Because a seismic dataset contains spatial and lithology information about the subterranean region of interest (102), the seismic dataset may be used to construct subsurface models of the subterranean region of interest (102). For example, the seismic dataset may be used to characterize and locate hydrocarbon reservoirs (104) and may be used to plan and drill a wellbore to extract said hydrocarbons. Further the seismic dataset and the subsurface models can inform oil and gas field planning and lifecycle management decisions. Thus, the quality of subsurface models, efforts to locate hydrocarbons, and well management decisions are all improved when the bandwidth of a seismic dataset is increased.

In one aspect, embodiments disclosed herein relate to a method to extend the bandwidth of a seismic dataset with machine learning (ML). In particular, synthetic seismic datasets are directly generated as a composition of geometric shapes. The synthetic datasets are not limited to a frequency range and are not reliant on a wavefield model (forward model) or knowledge of subsurface parameters such as impedance. Further, the synthetic datasets, when used to train a machine-learned model, develop a machine-learned model that is robust and capable of generalizing to new, unseen, and real seismic datasets. It is noted that while the methods described herein will be described under the context of a seismic dataset like that shown in FIG. 2, these methods are not limited to these seismic datasets. In general, embodiments disclosed herein can be applied to any pre-stack and post-stack seismic data. For example, embodiments disclosed herein can be applied to a collection of shot gathers before or after migration and also to stacked seismic datasets that are obtained by the application of move-out corrections. In other words, one with ordinary skill in the art will appreciate that the methods disclosed herein are applicable to seismic datasets that have undergone any number of pre-processing (or processing) steps commonly employed in the art.

Figure 3:
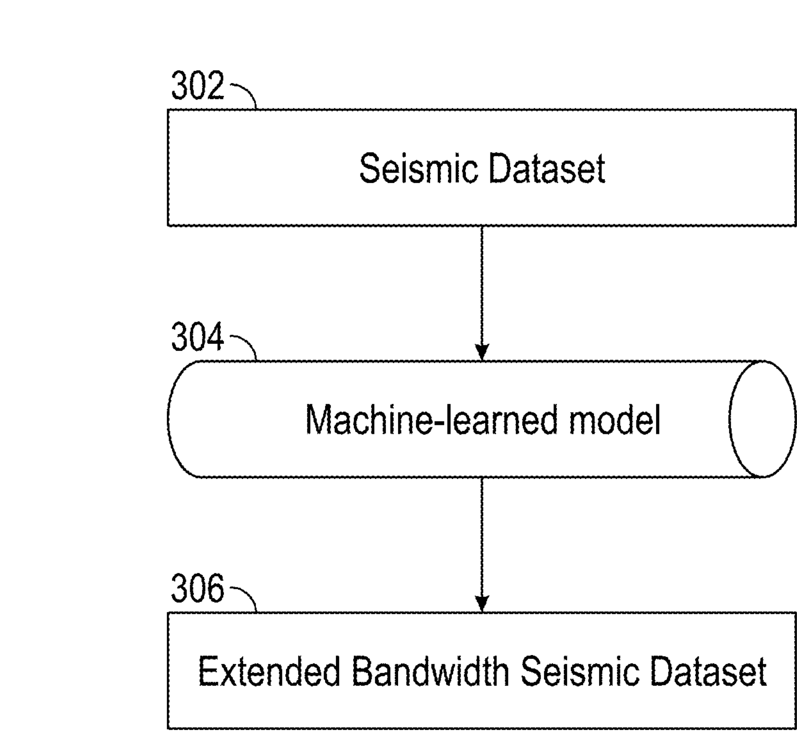
FIG. 3 depicts a workflow in accordance with one or more embodiments.

FIG. 3 depicts a high-level overview (300) of the seismic bandwidth extension process. First, a seismic dataset (302) is collected. The seismic dataset (302) may be acquired from a seismic survey (100). Further, the seismic dataset (302) may undergo any pre-processing (or processing) steps known in the art. The seismic dataset (302) is processed with a machine-learned model (304). The machine-learned model (304), and the data used to train it, will be described in greater detail later in the instant disclosure. However, for now, it is stated that the machine-learned model (304) is configured to receive the seismic dataset (302) and, upon processing, output another seismic dataset referred to herein as an extended bandwidth seismic dataset (306). The extended bandwidth seismic dataset (306) corresponds to the seismic dataset (302) but has greater bandwidth relative to the seismic dataset (302). The term "extended" indicates that the range of frequencies spanned by the extended bandwidth seismic dataset (306) covers more frequencies than the seismic dataset (302). The extension is such that the extended bandwidth seismic dataset (306), if processed by a Fourier transform, contains high frequencies not present in the seismic dataset (302). It may be said that the machine-learned model (304) "boosts" the bandwidth of the seismic dataset (302) to form the extended bandwidth seismic dataset (306). In general, the extended bandwidth seismic dataset (306) may also be passed to the machine-learned model (304), such that bandwidth of the original seismic dataset (302) may be boosted one or more times.

Machine learning (ML), broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein. However, one skilled in the art will recognize that the concepts and methods detailed hereafter are not limited by this choice of nomenclature.

Machine-learned model types may include, but are not limited to, generalized linear models, Bayesian regression, random forests, and deep models such as neural networks, convolutional neural networks, and recurrent neural networks. Machine-learned model types, whether they are considered deep or not, are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. It is noted that in the context of machine learning (ML), the regularization of a machine-learned model refers to a penalty applied to the loss function of the machine-learned model and should not be confused with the regularization of a seismic dataset. Commonly, in the literature, the selection of hyperparameters surrounding a machine-learned model is referred to as selecting the model "architecture". Once a machine-learned model type and hyperparameters have been selected, the machine-learned model is trained to perform a task. In accordance with one or more embodiments, a machine-learned model type and associated architecture are selected, the machine-learned model is trained to boost the bandwidth of a given seismic dataset (302), the performance of the machine-learned model is evaluated, and the machine-learned model is used in a production setting (also known as deployment of the machine-learned model).

As noted, the objective of the machine-learned model is to extend or boost the bandwidth of a given seismic dataset (302). In accordance with one or more embodiments, the selected machine-learned model (304) type is a convolutional neural network (CNN). A CNN may be more readily understood as a specialized neural network (NN). Thus, a cursory introduction to a NN and a CNN are provided herein. However, it is noted that many variations of a NN and CNN exist. Therefore, one with ordinary skill in the art will recognize that any variation of the NN or CNN (or any other machine-learned model) may be employed without departing from the scope of this disclosure. Further, it is emphasized that the following discussions of a NN and a CNN are basic summaries and should not be considered limiting.

Figure 4:
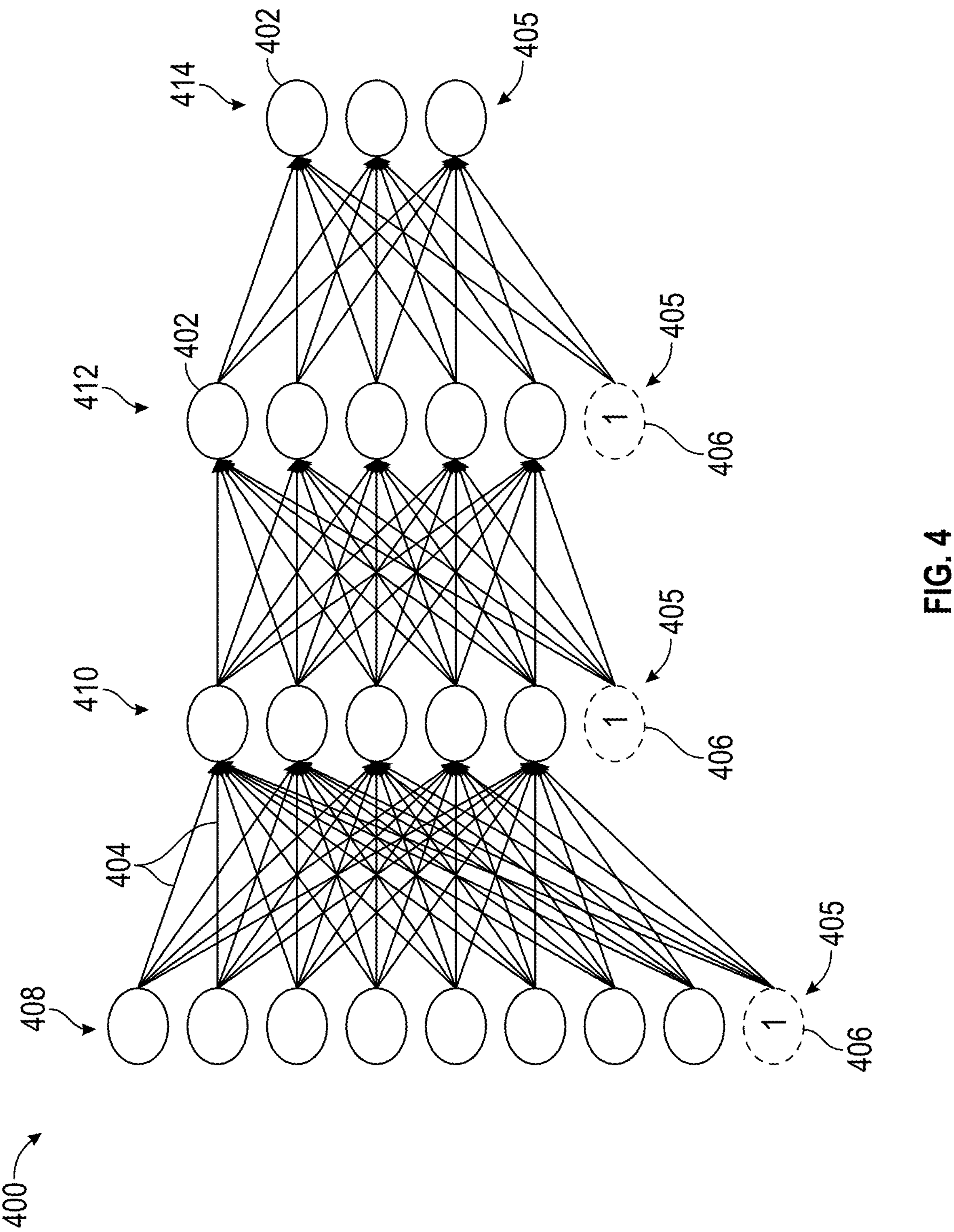
FIG. 4 depicts a neural network in accordance with one or more embodiments.

A diagram of a neural network is shown in FIG. 4. At a high level, a neural network (400) may be graphically depicted as being composed of nodes (402), where here any circle represents a node, and edges (404), shown here as directed lines. The nodes (402) may be grouped to form layers (405). FIG. 4 displays four layers (408, 410, 412, 414) of nodes (402) where the nodes (402) are grouped into columns, however, the grouping need not be as shown in FIG. 4. The edges (404) connect the nodes (402). Edges (404) may connect, or not connect, to any node(s) (402) regardless of which layer (405) the node(s) (402) is in. That is, the nodes (402) may be sparsely and residually connected. A neural network (400) will have at least two layers (405), where the first layer (408) is considered the "input layer" and the last layer (414) is the "output layer". Any intermediate layer (410, 412) is usually described as a "hidden layer". A neural network (400) may have zero or more hidden layers (410, 412) and a neural network (400) with at least one hidden layer (410, 412) may be described as a "deep" neural network or as a "deep learning method". In general, a neural network (400) may have more than one node (402) in the output layer (414). In this case the neural network (400) may be referred to as a "multi-target" or "multi-output" network.

Nodes (402) and edges (404) carry additional associations. Namely, every edge is associated with a numerical value. The edge numerical values, or even the edges (404) themselves, are often referred to as "weights" or "parameters". While training a neural network (400), numerical values are assigned to each edge (404). Additionally, every node (402) is associated with a numerical variable and an activation function. Activation functions are not limited to any functional class, but traditionally follow the form $$A = f\left(\sum_{i \in (incoming)} [(\text{node value})_i \, (\text{edge value})_i]\right) \quad \text{EQ 1}$$

where i is an index that spans the set of "incoming" nodes (402) and edges (404) and $f$ is a user-defined function. Incoming nodes (402) are those that, when viewed as a graph (as in FIG. 4), have directed arrows that point to the node (402) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (402) in a neural network (400) may have a different associated activation function. Often, as a shorthand, activation functions are described by the function $f$ by which it is composed. That is, an activation function composed of a linear function $f$ may simply be referred to as a linear activation function without undue ambiguity.

When the neural network (400) receives an input, the input is propagated through the network according to the activation functions and incoming node (402) values and edge (404) values to compute a value for each node (402). That is, the numerical value for each node (402) may change for each received input. Occasionally, nodes (402) are assigned fixed numerical values, such as the value of 1, that are not affected by the input or altered according to edge (404) values and activation functions. Fixed nodes (402) are often referred to as "biases" or "bias nodes" (406), displayed in FIG. 4 with a dashed circle.

In some implementations, the neural network (400) may contain specialized layers (405), such as a normalization layer, or additional connection procedures, like concatenation. One skilled in the art will appreciate that these alterations do not exceed the scope of this disclosure.

As noted, the training procedure for the neural network (400) comprises assigning values to the edges (404). To begin training the edges (404) are assigned initial values. These values may be assigned randomly, assigned according to a prescribed distribution, assigned manually, or by some other assignment mechanism. Once edge (404) values have been initialized, the neural network (400) may act as a function, such that it may receive inputs and produce an output. As such, at least one input is propagated through the neural network (400) to produce an output. Training data is provided to the neural network (400). Generally, training data consists of pairs of inputs and associated targets. The targets represent the "ground truth", or the otherwise desired output, upon processing the inputs. In the context of the instant disclosure, an input is a seismic dataset and its associated target is a bandwidth extended seismic dataset. During training, the neural network (400) processes at least one input from the training data and produces at least one output. Each neural network (400) output is compared to its associated input data target. The comparison of the neural network (400) output to the target is typically performed by a so-called "loss function"; although other names for this comparison function such as "error function", "misfit function", and "cost function" are commonly employed. Many types of loss functions are available, such as the mean-squared-error function, however, the general characteristic of a loss function is that the loss function provides a numerical evaluation of the similarity between the neural network (400) output and the associated target. The loss function may also be constructed to impose additional constraints on the values assumed by the edges (404), for example, by adding a penalty term, which may be physics-based, or a regularization term (not be confused with regularization of seismic data). Generally, the goal of a training procedure is to alter the edge (404) values to promote similarity between the neural network (400) output and associated target over the training data. Thus, the loss function is used to guide changes made to the edge (404) values, typically through a process called "backpropagation".

While a full review of the backpropagation process exceeds the scope of this disclosure, a brief summary is provided. Backpropagation consists of computing the gradient of the loss function over the edge (404) values. The gradient indicates the direction of change in the edge (404) values that results in the greatest change to the loss function. Because the gradient is local to the current edge (404) values, the edge (404) values are typically updated by a "step" in the direction indicated by the gradient. The step size is often referred to as the "learning rate" and need not remain fixed during the training process. Additionally, the step size and direction may be informed by previously seen edge (404) values or previously computed gradients. Such methods for determining the step direction are usually referred to as "momentum" based methods.

Once the edge (404) values have been updated, or altered from their initial values, through a backpropagation step, the neural network (400) will likely produce different outputs. Thus, the procedure of propagating at least one input through the neural network (400), comparing the neural network (400) output with the associated target with a loss function, computing the gradient of the loss function with respect to the edge (404) values, and updating the edge (404) values with a step guided by the gradient, is repeated until a termination criterion is reached. Common termination criteria are: reaching a fixed number of edge (404) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (404) values are no longer intended to be altered, the neural network (400) is said to be "trained."

A CNN is similar to a neural network (400) in that it can technically be graphically represented by a series of edges (404) and nodes (402) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. Images have such a structural relationship. A seismic dataset may be organized and visualized as an image. Consequently, a CNN is an intuitive choice for processing a seismic dataset.

A structural grouping, or group, of weights is herein referred to as a "filter". The number of weights in a filter is typically much less than the number of inputs, where here the number of inputs refers to the number of pixels in an image or the number of trace-time (or trace-depth) values in a seismic dataset. In a CNN, the filters can be thought as "sliding" over, or convolving with, the inputs to form an intermediate output or intermediate representation of the inputs which still possesses a structural relationship. Like unto the neural network (400), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. In some instances, the structural relationship of the final intermediate representations is ablated; a process known as "flattening". The flattened representation may be passed to a neural network (400) to produce a final output. Note, that in this context, the neural network (400) is still considered part of the CNN. Like unto a neural network (400), a CNN is trained, after initialization of the filter weights, and the edge (404) values of the internal neural network (400), if present, with the backpropagation process in accordance with a loss function.

Figure 5:
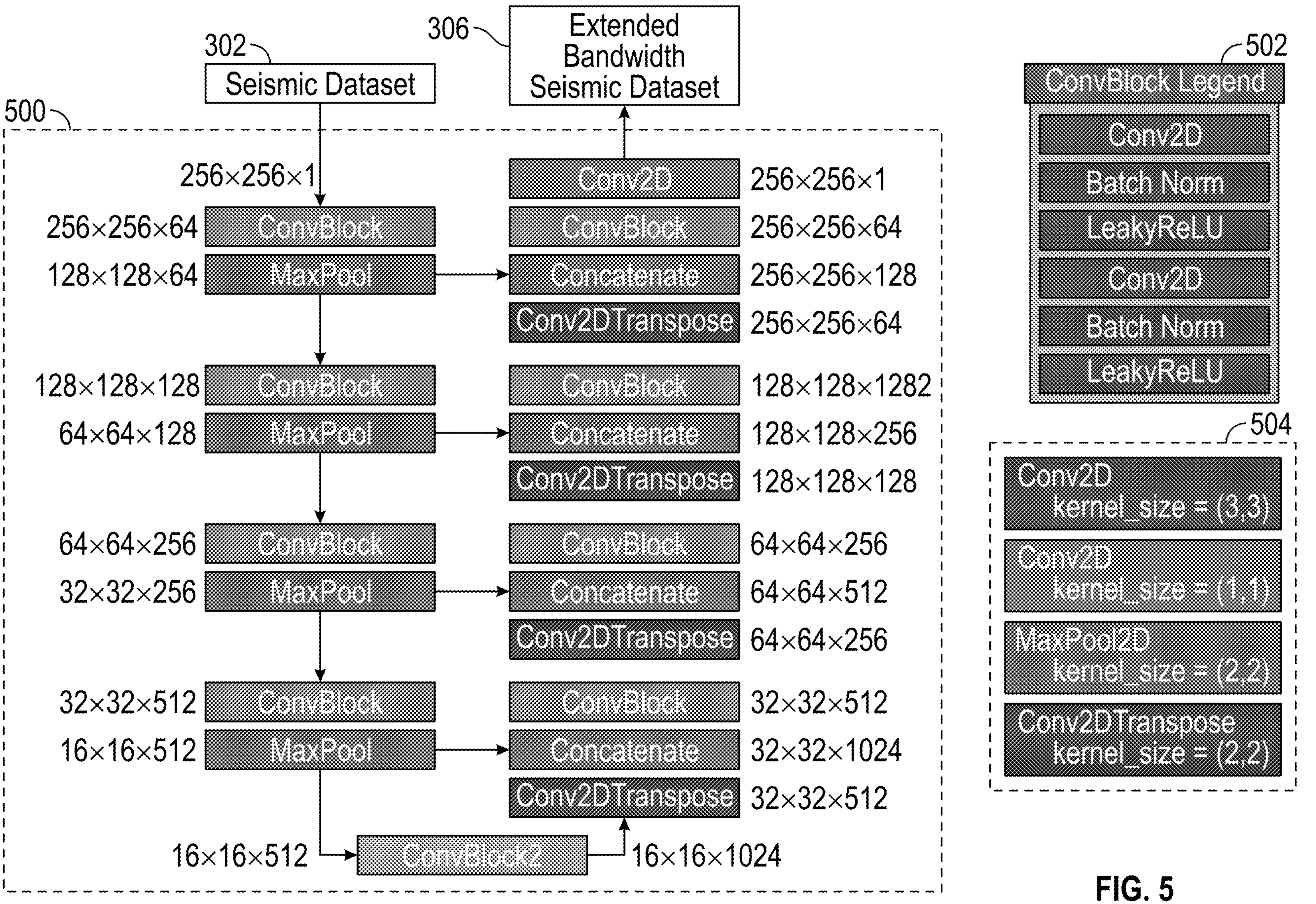
FIG. 5 depicts a convolutional neural network in accordance with one or more embodiments.

In accordance with one or more embodiments, the architecture of the CNN (500) is depicted in FIG. 5. The CNN (500) accepts a seismic dataset (302) as an input. The CNN (500) processes the seismic dataset (302) with a series of convolutional blocks, pooling operations, transpose (or upsampling) operations, and concatenations. The components of a convolutional block, in accordance with the CNN (500) architecture depicted in FIG. 5, are shown in the ConvBlock legend (502). As shown, each convolutional block consists of a 2-dimensional convolution operation, followed by a batch normalization operation, followed by a leaky ReLu activation function, repeated two times. In accordance with one or more embodiments, FIG. 5 also depicts the values of the CNN hyperparameters (504) governing the CNN (500). The CNN hyperparameters (504) indicate the size of the convolution kernel used in the convolutions of the CNN (500), the size of the max pooling kernel, and the size of the transpose kernel, in accordance with one or more embodiments. The CNN hyperparameters (500) may be selected by a user or may be identified during training using a set of data similar to the training data known as a validation set. Additionally, FIG. 5 illustrates the relative size of the data throughout the operations of the CNN (500). In the example of FIG. 5, the seismic dataset consist of 256 traces and each trace has 256 discrete time samples. The size of the data as it is processed by the CNN (500) is dependent on the size of the input seismic dataset. As such, the relative data sizes depicted in FIG. 5 are given with respect to a seismic dataset with 256 traces each with 256 time samples, however, one with ordinary skill in the art will recognize that the CNN (500) of FIG. 5 is not limited to this size of input. In general, the CNN (500) of FIG. 5 can accept an input of almost any size so long as the convolutional operations and max pooling operations do not reduce the intermediate data below the defined kernel sizes of these operations, respectively. Using this example input size of 256 traces each with 256 time samples and the kernel sizes given in the CNN hyperparameters (504), the first convolutional block of the CNN does not reduce the size of the input (indicating padding is used during the convolution operations) and generates 64 intermediate representations. Each of these intermediate representations are then processed by a max pooling operation which reduces the intermediate data size to 128 by 128 by 64. The intermediate data is both retained for later use (as a copy) and passed on to additional operations. Specifically, the intermediate data is processed by three more sets of convolutional blocks and max pooling operations, where a copy of the intermediate data is again retained after each max pooling operation, until the intermediate data is of the size 16 by 16 by 512. A convolutional block is then applied to double the number of intermediate representations, each of size 16 by 16. The CNN (500) then applies a transpose operation which effectively increases, or upsamples, the size of the intermediate data. In the example of FIG. 5, after the first transpose operation, the size of each intermediate representation in the intermediate data is increased from 16 by 16 to 32 by 32, or doubled in each dimension, due to the kernel size of the transpose operations being set to (2, 2). After transposition, the intermediate data is concatenated with a previously retained copy of the intermediate data from a previous operation. A convolutional block is applied to the concatenated data. This process of transposition, concatenation with a previous copy of intermediate data, and application of a convolutional block is applied three times. The result of this process is that each intermediate representation now has the same size as the initial input. The intermediate representations are then processed with a special convolutional operation with a kernel size of (1, 1). This effectively collapses the intermediate representations so to produce the output, or extended bandwidth seismic dataset (306), with the same size as the original seismic dataset (302). Therefore, if trained correctly, the CNN (500) of FIG. 5 is configured to accept a seismic dataset (302) and return an extended bandwidth seismic dataset (306), where the extended bandwidth seismic dataset (302) is the same size as the seismic dataset (302) but has increased resolution (extended bandwidth).

While an embodiment using a CNN (500) for the machine-learned model type has been described above, one skilled in the art will appreciate that the instant disclosure is not limited to this machine-learned model type. Machine-learned models such as a random forest, visual transformers (ViTs), or non-parametric methods such as K-nearest neighbors or a Gaussian process may be readily inserted into this framework and do not depart from the scope of this disclosure.

To train the machine-learned model (304) (e.g., the CNN (500)), training data must be provided. Commonly, in the literature, training data is collected from a variety of seismic surveys and/or synthetically generated through a modeling process. When training data is collected from seismic surveys, typically, the collected seismic dataset is considered the extended bandwidth seismic dataset and this dataset is processed with a bandpass filter in the frequency domain to effectively reduce its bandwidth. That is, in the case of data collection from seismic surveys, the seismic datasets (or inputs) used in training are frequency truncated versions of the originally acquired seismic datasets. In the case of generating synthetic seismic datasets for training data, a modeling process is used. Generally, the modeling processes require prior knowledge about the subterranean region of interest (102), such as the knowledge about geology, geophysics, and petrophysics. For example, a velocity model of the subterranean region of interest (102) may be required. A velocity model can be represented as $$m = m(x), \qquad \text{EQ 2}$$

Where x represents a spatial coordinate, such as a location in a subterranean region of interest (102) defined by an x-axis coordinate, a y-axis coordinate, and a depth, d, (e.g., (x, y, d)), and m is a vector indicating the directional velocities at the spatial coordinate x. In some implementations, the subterranean region of interest (102) may be isotropic such that the velocity m at a spatial coordinate may be represented as a scalar. With prior knowledge, such as the velocity model, a forward modeling process may be used to simulate the propagation of a seismic wave from one or more seismic sources (106) to one or more simulated seismic receivers (120).

To model the wave propagation, the forward modeling process requires a governing equation such as, for example, the generalized wave equation. The forward modeling process may employ a finite difference method to solve the following expression of the wave equation:

$$\left(s\frac{\partial^2}{\partial t^2} - \nabla^2\right)p(x, t; x_s) = f(t)\delta(x - x_s). \qquad \text{EQ 3}$$

In EQ. 3, s is the square of the reciprocal of velocity at spatial coordinate x as given by a supplied velocity model m, $\nabla^2$ is the Laplacian operator, p represents the seismic wave wavefield, $x_s$ is the spatial coordinate for a seismic source (106), and $f(t)$ is the signature of the seismic source (106) (e.g., a Ricker wavelet). Thus, a seismic dataset can be simulated at an arbitrary seismic receiver (120) location $x_s$.

Both methods of acquiring training data—collecting real seismic datasets from seismic surveys and generating synthetic seismic data sets through a modeling process—possess significant disadvantages. In general, collecting training data through many seismic surveys is a costly process. Further, the bandwidth of the targets (i.e., the desired output) is limited to the bandwidth of the seismic survey. Finally, real seismic datasets are restricted to the subsurface features present in the associated region. Consequently, machine-learned models trained using the real seismic datasets do not generalize well to seismic datasets from regions with different subsurface features. That is, machine-learned models trained with real seismic datasets become significantly inaccurate when processing seismic data from a subterranean region of interest (102) which is geologically dissimilar from that used in training. Synthetic seismic datasets, generated from a modeling process, are dependent on some prior knowledge of the subterranean region of interest (102) and the prior knowledge may be inaccurate leading to poor synthetic seismic datasets. Further, synthetic datasets generated through these modeling processes are known to have differences in the character of both signal and noise from real seismic datasets making machine-learned models trained with these synthetic seismic datasets unable to generalize to real seismic data.

In contrast, in one or more embodiments of the instant disclosure, synthetic training data is generated directly in a time domain with geometric shapes. Training data generated in this manner is not limited to any range of frequencies, can cover a broad range of geological features, and can mimic real seismic datasets in terms of signal and noise character.

Figures 6A, 6B:
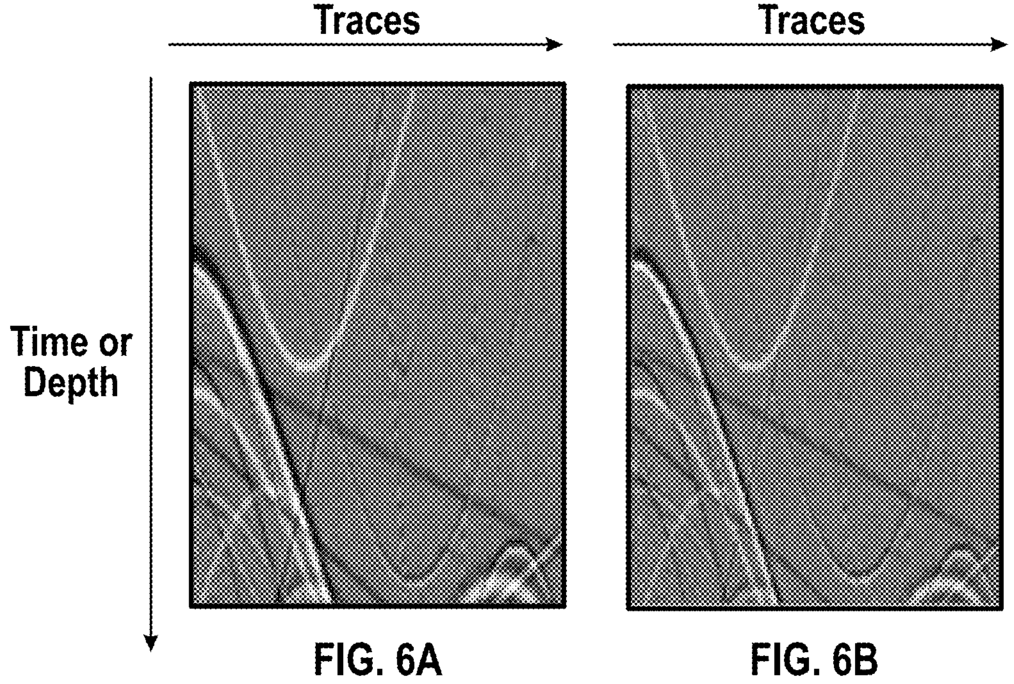
FIG. 6A depicts a low bandwidth seismic dataset in accordance with one or more embodiments.
FIG. 6B depicts a high bandwidth seismic dataset in accordance with one or more embodiments.

FIGS. 6A and 6B depict a seismic dataset and an associated extended bandwidth seismic dataset, respectively, that have been generated using geometric shapes. The synthetically formed seismic dataset (FIG. 6A) and the synthetically formed extended bandwidth seismic dataset (FIG. 6B) can be used as an input-target pair to train the machine-learned model (304). For concision, hereafter, a pair of synthetically generated input-target seismic datasets will be referred to as a synthetic dataset. Further, the input portion (e.g., FIG. 6A) will be referred to as a low bandwidth seismic dataset and the target portion (e.g., FIG. 6B) will be referred to as a high bandwidth seismic dataset where the bandwidth of the high bandwidth seismic dataset is greater (i.e., extended to contain higher frequencies) relative to the low bandwidth seismic dataset. That is, a synthetic dataset includes a low bandwidth seismic dataset and an associated high bandwidth seismic dataset. A plurality of synthetic datasets may be used to train the machine-learned model (304).

Figure 7:
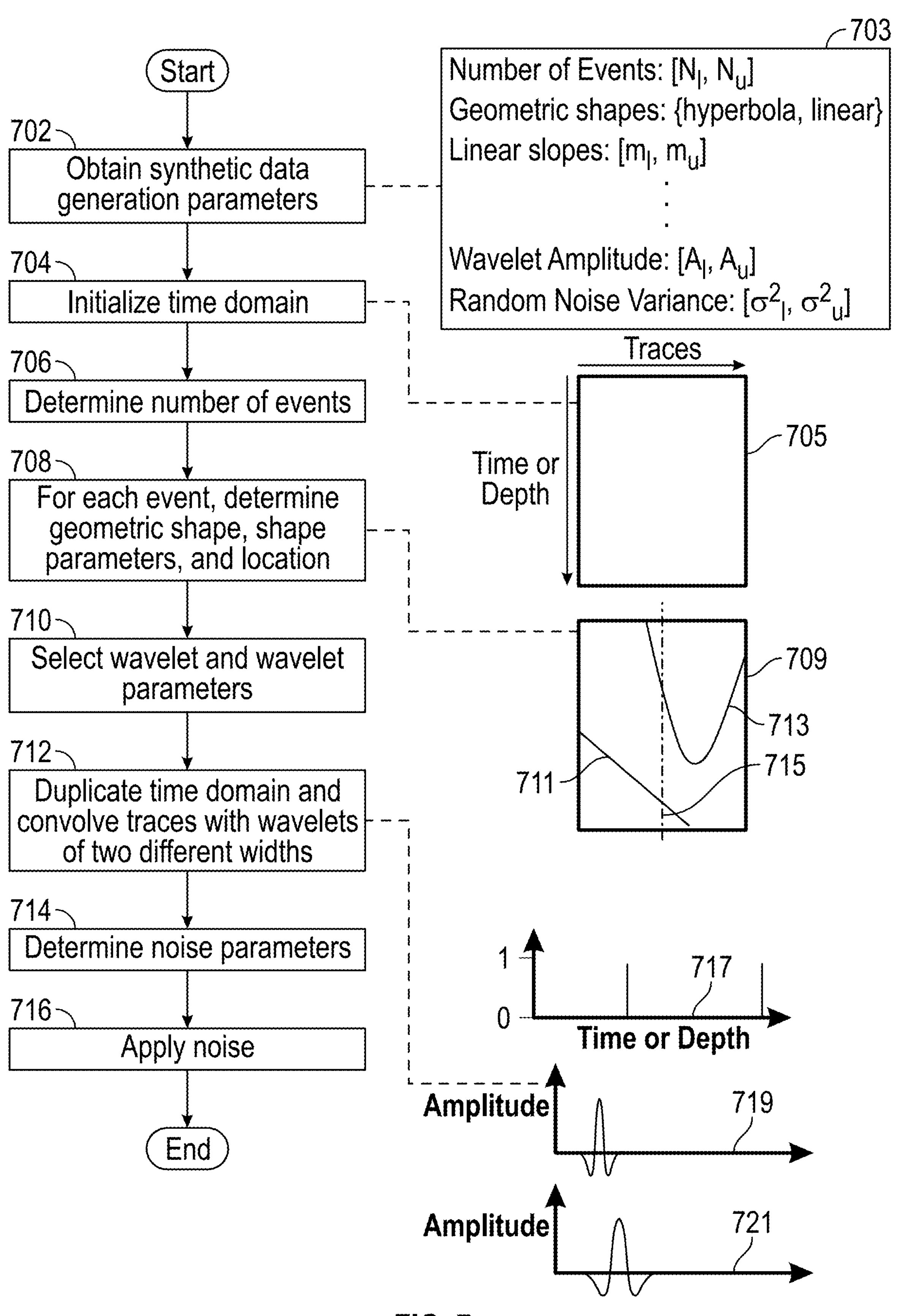
FIG. 7 depicts a synthetic data generation process in accordance with one or more embodiments.

In accordance with one or more embodiments, FIG. 7 depicts a flowchart outlining this synthetic dataset generation process along with graphical illustrates of select steps to provide greater clarity. As seen in FIG. 7, in Block 702, user-supplied synthetic data generation parameters are obtained. The synthetic data generation parameters control aspects of the synthetic data generation process. Examples of synthetic data generation parameters (703) are shown. To create a synthetic dataset, parameters such as the number of events and the available geometric shapes that describe each event must be defined. In accordance with one or more embodiments, the synthetic data generation parameters (703) are defined, by a user, as ranges or sets, where, for a given seismic dataset, a value is selected by random from within the range or set. For example, a user may prescribe a lower and upper bound for the number of events in a synthetic dataset. The lower and upper bound for the number of events are symbolized as $N_l$ and $N_u$ in FIG. 7, respectively. For each event, a geometric shape must be chosen. Therefore, the synthetic data generation parameters (703) also describe a set of available shapes, such as a hyperbola or linear line, as well as ranges or sets for any parameters required to describe the shape. For example, in the case that for an event a linear line is selected as the geometric shape, the synthetic data generation parameters (703) define a range for acceptable linear slopes (lower bound $m_l$ and upper bound $m_u$) and a method for selecting the location of the linear slope (not shown). In accordance with one or more embodiments, the synthetic data generation parameters (703) also include a set of wavelets, where for a given event or for a given synthetic dataset, the randomly selected seismic wavelet is convolved with the event or traces of the synthetic dataset (to be described in greater detail below). Further, the synthetic data generation parameters (703) include a range, or other method, for defining the amplitude of the wavelet and one or more methods for injecting noise into the synthetic dataset. For concision, not all synthetic data generation parameters (703) are enumerated in FIG. 7. However, one with ordinary skill in the art will recognize that many alterations to the synthetic dataset generation process of FIG. 7 can be made without departing from the scope of this disclosure and that these alterations may necessitate fewer or additional synthetic data generation parameters (703).

Keeping with FIG. 7, in Block 704, for a synthetic dataset, the time domain of the synthetic dataset is initialized. The time domain of the synthetic dataset is a collection of traces organized according to their simulated location and aligned according to time or depth. In accordance with one or more embodiments, the time domain is initialized such that all the traces have a value of zero for every time or depth. In other embodiments, the time domain is initialized so that the values of the traces have random values. It is noted that the time domain may be discrete or continuous. In the case that the time domain is continuous, it may be discretized once the synthetic dataset is completed. Again, while the term time domain is used, the domain may also be spatial according to depth where time and depth may be interchanged according to a time-depth transformation function. An initialized time domain (705) is shown in FIG. 7.

In Block 707 of FIG. 7, once a time domain (705) for a synthetic dataset has been initialized, the number of events to be inserted into the time domain is determined. In accordance with one or more embodiments, the number of events to be inserted into the time domain for the synthetic dataset is randomly selected from within a range defined by the synthetic data generation parameters (703). For example, the synthetic data generation parameters may define a lower bound and an upper bound the for the number of events that can be used when generating a synthetic dataset as $N_l$ and $N_u$, respectively, where $N_l$ and $N_u$ are integers and $0<N_l \leq N_u$. In this case, the number of events is determined by randomly selecting a number greater than or equal to $N_l$ and less than or equal to $N_u$. In one or more embodiments, the probability of selecting a number of events within a user-provided range need not be uniform across the range. In this case, the user also specifies the probability distribution for the available number of events that can be selected as part of the synthetic data generation parameters (703).

For a synthetic dataset, once the number of events has been determined, for each event a geometric shape is determined as shown in Block 708. In one or more embodiments, the geometric shape of an event is randomly selected from a set of geometric shapes provided in the user-defined synthetic data generation parameters (703). For example, the synthetic data generation parameters (703) may define the geometric shapes of a hyperbola (or hyperbolic line) and a linear line as available geometric shapes. Further, the user may indicate the probability that any geometric shape in the set of geometric shapes is selected. In Block 708, once a geometric shape is selected, its location and shape parameters are also determined. The shape parameters encompass any additional information required to sufficiently describe the geometric shape. For example, in the case where a linear line is selected for an event, the shape parameters include, at least, the slope of the linear line. The method for determining the shape parameters of a geometric shape is defined by the synthetic data generation parameters (703). In one or more embodiments, a range of suitable linear slopes is bounded by a lower bound, $m_l$, and an upper bound, $m_u$, where the lower and upper bounds of suitable slopes are provided by the user in the synthetic data generation parameters (703). In one or more embodiments, when an event is determined be a linear line, the slope of the linear line for that event is randomly selected from within the range defined by the slope lower bound, $m_l$, and the slope upper bound, $m_u$, according to a user-provided probability distribution (e.g., a uniform distribution). In the case where an event is determined to be a hyperbola (i.e., hyperbolic line), shape parameters specific to the hyperbola, and the method by which they are selected, are determined according to the synthetic data generation parameters (703). Further, in Block 708, the location where the geometric shape is placed within the time domain (705) is determined. The possible placement locations, and the method of selecting a location, are defined in the synthetic data generation parameters (703). For example, in one or more embodiments, for an event that has been determined to be a linear line, the intercept of the line with the time or depth axis is randomly selected. In FIG. 7, a time domain with events (709) is shown. In the example of FIG. 7, the time domain with events (709) has two events. One of the events has a geometric shape of a linear line (711) and the other event has a geometric shape of a hyperbola (713). In accordance with one or more embodiments, the number of events (two), their geometric shapes, and their forms and locations were determined through random selection within options described by the user-provided synthetic data generation parameters (703). Further, an example trace (715) is represented with a dashed line. An alternative view (717) of the example trace (715) of the time domain with events (709) is shown in FIG. 7. As shown, and in accordance with one or more embodiments, the example trace (715) has a value of one at the time or depth where an event occurs. In other embodiments, the value of a trace at an intersection with an event may be a value other than one.

In FIG. 7, in Block 710, a wavelet and wavelet parameters are selected. Again, the available options for a wavelet and its parameters and the method for selecting a wavelet and its parameters are defined by the user-provided synthetic data generation parameters (703). For example, available wavelets may include a Ricker wavelet, a Gaussian wavelet, Ormsby wavelet, Klauder wavelet, or any other wavelet known in the art. In one or more embodiments, a single wavelet is selected for the entire synthetic dataset. That is, the selected wavelet will be applied to every event in every trace (through convolution). In other embodiments, a wavelet is selected for each event. Likewise, the wavelet parameters, defined in the synthetic data generation parameters (703), describe the amplitude and width (in the time or depth axis) of the wavelet. As previously stated, the synthetic dataset generation process creates a synthetic dataset that is a pair of input-target seismic datasets. The input portion of the synthetic dataset is referred to as a low bandwidth seismic dataset and the target portion is referred to as a high bandwidth seismic dataset where the bandwidth of the high bandwidth seismic dataset is greater (i.e., extended to contain higher frequencies) relative to the low bandwidth seismic dataset. Thus, when generating a synthetic dataset, both the low bandwidth seismic dataset and the high bandwidth seismic dataset need to be formed. In general, the relative bandwidths of the low bandwidth seismic dataset and the high bandwidth seismic dataset are controlled through selection of the wavelet widths. As will be discussed later, the width of a wavelet must be defined for both the high bandwidth seismic dataset and the low bandwidth seismic dataset that compose a synthetic dataset. In one or more embodiments, the amplitude of a wavelet is randomly selected from a range of amplitudes where the range is bounded by and amplitude lower bound, $A_l$, and an amplitude upper bound, $A_u$, according to a probability distribution over the range of amplitudes. In one or more embodiments, the amplitude of the wavelet may further be a function of time or depth. For example, the amplitude may be defined to decrease at a given rate according to time or depth. In general, the amplitude of a wavelet may be prescribed through an amplitude function, wherein the amplitude function is defined in the synthetic data generation parameters (703). In the simplest case, the amplitude function is a constant function (i.e., invariant to time or depth) and the amplitude is randomly selected from a range defined by the synthetic data generation parameters (703) (i.e., between an amplitude lower bound, $A_l$, and an amplitude upper bound, $A_u$).

Figure 8A:
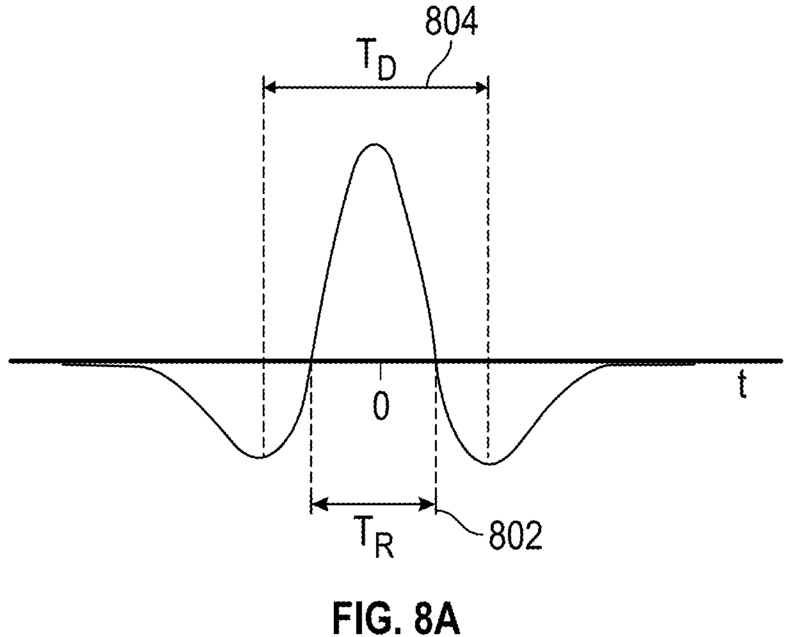
FIG. 8A depicts a Ricker wavelet in accordance with one or more embodiments.
Figure 8B:
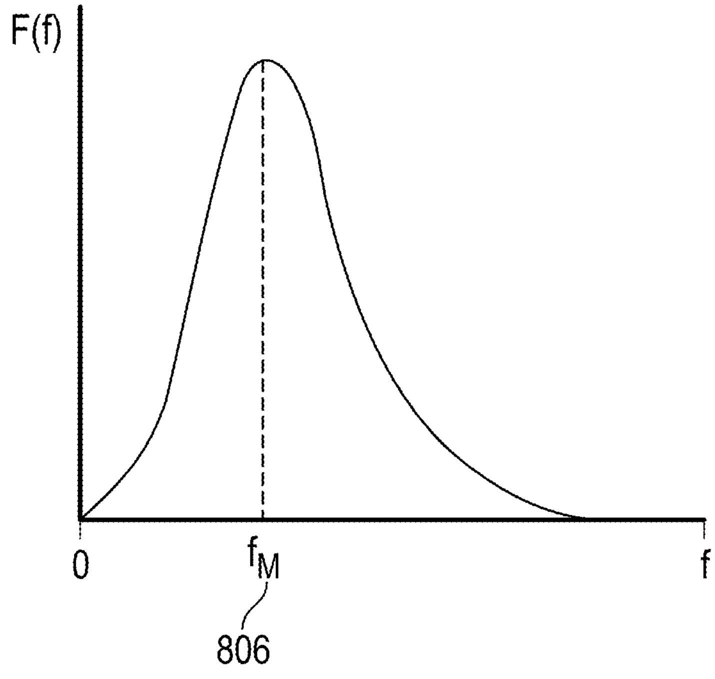
FIG. 8B depicts the amplitude of the frequency spectra of a Ricker wavelet in accordance with one or more embodiments.

The widths of the wavelets, or a method determining their widths, for the low bandwidth seismic dataset and the high bandwidth seismic dataset are listed in the user-provided synthetic data generation parameters (703). The width of a wavelet is directly related to its bandwidth. In accordance with one or more embodiments, the wavelet width is smaller (i.e., narrower) for the high bandwidth seismic dataset relative to the width of the wavelet used in the low bandwidth seismic dataset. The relationship between the width of a wavelet and its bandwidth is illustrated in FIGS. 8A and 8B for a Ricker wavelet. FIG. 8A depicts a Ricker wavelet and further defines width of the main lobe (804), $T_D$, and the zero-crossing width (802), $T_R$. For the Ricker wavelet, the width of the main lobe (804) and the zero-crossing width (802) are related according to $$T_R = \frac{T_D}{\sqrt{3}}. \quad \text{EQ 4}$$

FIG. 8B depicts the amplitude of the frequency spectrum of the Ricker wavelet in the frequency domain. As seen, there is a peak frequency (806), $f_M$, where the amplitude of the frequency spectrum is at a maximum. In general, as the bandwidth of the Ricker wavelet increases, the peak frequency (806) will also increase. As such, peak frequency (806) may be used as a surrogate to compare the relative bandwidths of two or more Ricker wavelets. The peak frequency (806) of the Ricker wavelet is related to the zero-crossing width (802) according to $$f_M = \frac{\sqrt{2}}{\pi T_R}, \quad \text{EQ 5}$$

where the zero-crossing width (802) is given in seconds. Therefore, EQ. 5 provides a method to calculate the peak frequency (804) and compare the relative bandwidths of Ricker wavelets simply by stating either the width of the main lobe (804) or the zero-crossing width (802) of the Ricker wavelet in the time domain.

Returning to FIG. 7, in Block 712, the time domain with events (709) is duplicated to form the low bandwidth seismic dataset and the high bandwidth seismic dataset. Further, the widths of the wavelet(s) to be used in the low bandwidth seismic dataset and the high bandwidth seismic dataset are listed in the user-provided synthetic data generation parameters (603). For example, in the case where a Ricker wavelet is used in the synthetic dataset, the width of the wavelet may be defined by specifying a width of the main lobe (802) to be used in the low bandwidth seismic dataset and the high bandwidth seismic dataset. In one or more embodiments, the width of wavelets used in the high bandwidth seismic dataset and the low bandwidth seismic dataset may be determined by specifying a relative ratio of peak frequencies. For example, the synthetic data generation parameters (603) may specify that for each synthetic dataset a Ricker wavelet should be used and that the width of the main lobe (802) of the Ricker wavelet to be used with the low bandwidth seismic dataset should be randomly selected from an interval bounded with a width lower bound, $W_l$, and a width upper bound, $W_u$. Further, in one or more embodiments, the synthetic data generation parameters (603) may specify that the width of the main lobe (802) of the Ricker wavelet to be used with the high bandwidth seismic dataset is calculated such that the peak frequency (806) of the Ricker wavelet of the high bandwidth seismic dataset is a factor larger than the peak frequency (806) of the Ricker wavelet of the associated low bandwidth seismic dataset. In this way, a synthetic dataset with a given level of "boost" (i.e., the ratio of $$\left.\frac{(f_M)^{high}}{(f_M)^{low}}\right)$$

may be formed). FIG. 6B depicts an example wavelet to be used with a high bandwidth seismic dataset (719) and the wavelet to be used with the associated low bandwidth seismic dataset (721). Additionally, in Block 712, the wavelets are convolved with the appropriate traces of the low bandwidth seismic dataset and the high bandwidth seismic dataset. For example, in the case where a single wavelet type with a defined amplitude (which may be time or depth dependent) is to be applied to every event in a synthetic dataset, then the narrower wavelet (719) is convolved with each trace of the high bandwidth seismic dataset copy of the time domain with events (709) and the wider wavelet (721) is convolved with each trace of the low bandwidth seismic dataset copy of the time domain with events (709). In one or more embodiments, the widths of the wavelets are additionally a function of time or depth, where the functional relationship between time or depth and width is defined in the user-provided synthetic data generation parameters (703). Changing the width of the wavelet as a function of time or depth mimics real seismic datasets where the temporal frequency bandwidth is not stationary or constant for all events. The variation in temporal frequency bandwidth is due to absorption and the frequency content is reduced with two-way travel time. Therefore, the frequency bandwidth of later primary reflection arrivals is always less than that of earlier arrivals. In case of a marine seismic acquisition, multiple reverberations travelling in the water layer will show broader bandwidth than subsurface reflections with the same arrival time, since the former experience much less absorption than the latter.

In Block 714, noise parameters are determined from the synthetic data generation parameters (703). Various types of noise may be added to the synthetic dataset. For example, random perturbations can be applied to each of the traces in the low and high bandwidth seismic datasets. The strength of the perturbations can be described by a variance. In one or more embodiments, the variance of noise applied to the synthetic dataset is randomly sampled from within a range bounded by a variance lower bound, $$\sigma_l^2,$$

and a variance upper bound, $$\sigma_u^2.$$

In one or more embodiments, the range of available variances is given in the synthetic data generation parameters (703). In one or more embodiments, static noise may also be applied to the synthetic dataset. Static noise is applied by shifting in time or depth, by a prescribed amount (e.g., random), the traces in the seismic dataset. Further, in one or more embodiments, the amplitudes of various traces may be altered (e.g., multiplied by a random factor). Such an alteration injects noise into the synthetic dataset and is intended to mimic variation in seismic receiver (120) sensitivities or couplings. In Block 716, once the noise parameters have been determined, the noise is applied to the synthetic dataset. One with ordinary skill in the art will appreciate that noise can be added to the synthetic dataset in variety of ways and that not all noise injection schemes can be enumerated herein. Further, any noise injection scheme can be applied to the synthetic dataset without departing from the scope of this disclosure.

The result of the synthetic data generation process of FIG. 7 is a synthetic dataset. The synthetic dataset is composed of both a low bandwidth seismic dataset and a high bandwidth seismic dataset. Again, an example of a synthetic dataset is shown in FIGS. 6A and 6B. As seen, the low bandwidth seismic dataset (FIG. 6A) and the high bandwidth seismic dataset (FIG. 6B) are similar because the time domain was duplicated after the selection and incorporation of events into the time domain. The difference between the low bandwidth seismic dataset and the high bandwidth seismic dataset is that width of the wavelet(s) convolved with the traces of the high bandwidth seismic dataset is narrower relative to the wavelet(s) convolved with the traces of the low bandwidth seismic dataset. The widths of the wavelets used with the low and high bandwidth seismic datasets can be tailored such that the high bandwidth seismic dataset has a fixed "boost" over the low bandwidth seismic dataset.

Figure 9:
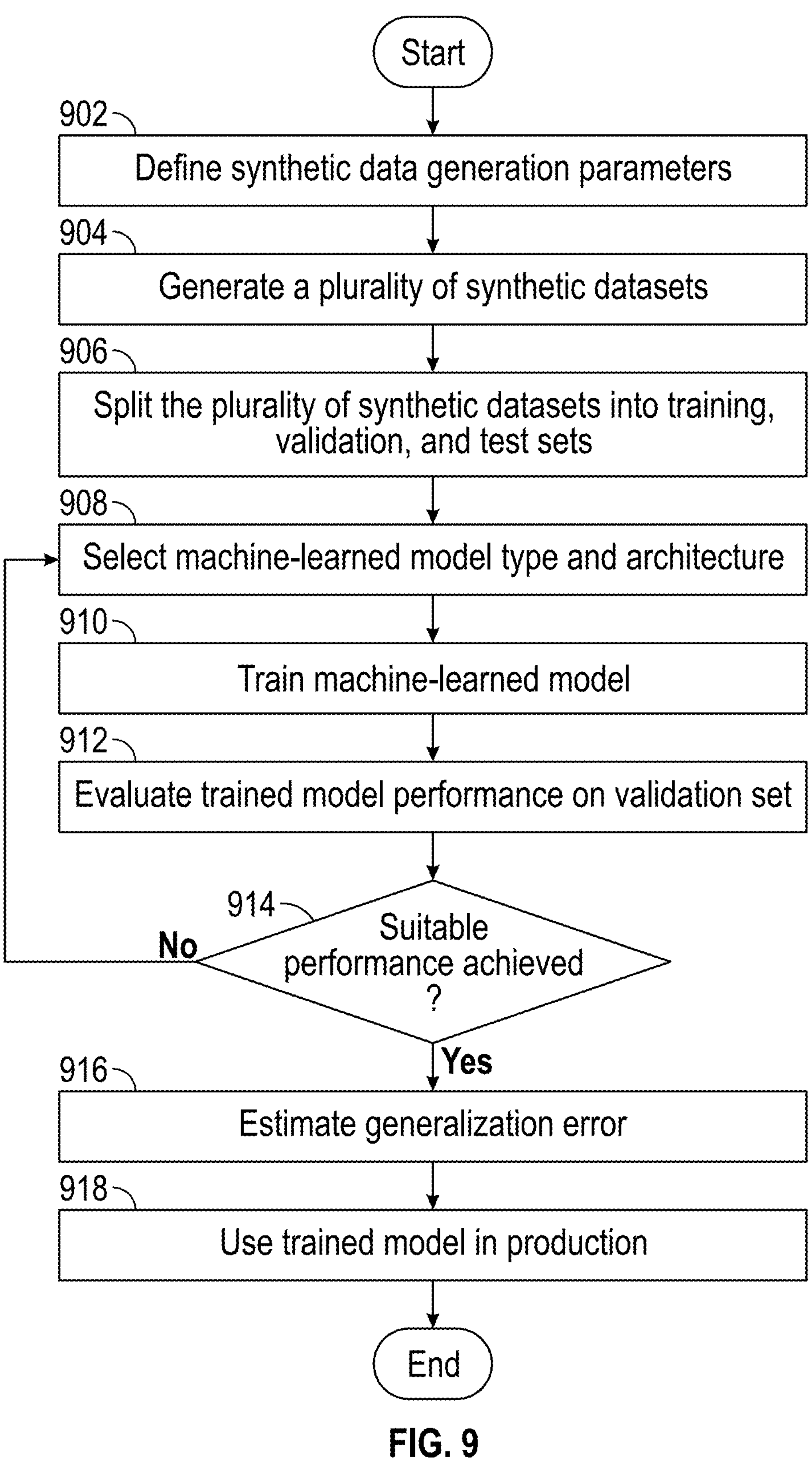
FIG. 9 depicts a flowchart in accordance with one or more embodiments.

By repeating the synthetic data generation process outlined in the flowchart of FIG. 7, a plurality of synthetic datasets, wherein each synthetic dataset comprises a low bandwidth seismic dataset and an associated high bandwidth seismic dataset, can be formed. The plurality of seismic datasets can be used as training data to train the machine-learned model (304). The process of generating the plurality of synthetic datasets and using the plurality of synthetic datasets to, in part, train the machine-learned model (304) is depicted in FIG. 9, in accordance with one or more embodiments. In Block 902, a user defines the synthetic data generation parameters (703) that will guide the synthetic data generation process. The user defines all parameters and associated functions and/or probability distributions desired for use during the synthetic data generation process. For example, the user may specify that for each synthetic dataset a random number of events should be used and that the randomly drawn number must come from a specified range. In Block 904, the synthetic data generation process of FIG. 7 is applied multiple times to generate a plurality of synthetic datasets. In Block 906, the plurality of synthetic datasets is split into a training set, validation set, and test set. In one or more embodiments, the validation and the test set are the same such that the plurality of synthetic datasets is effectively split into a training set and a validation/testing set. In accordance with one or more embodiments, multiple machine-learned model types and architectures are evaluated to discover the model with the best performance. In Block 408, a machine-learned model type (e.g., a CNN) and an architecture (e.g., number of layers, kernel sizes, activation functions) are selected. In accordance with one or more embodiments, the selection of the machine-learned model type and architecture is performed by cycling through a set of user-defined models and associated architectures. In other embodiments, the machine-learned model type and architecture are selected based on the performance of previous models, for example, using a Bayesian-based search. In Block 910, with a machine-learned model type and associated architecture selected, the machine-learned model is trained using the training set. The training set is composed of a portion of the plurality of synthetic datasets. Each synthetic dataset consists of a low bandwidth seismic dataset and an accompanying high bandwidth seismic dataset. During training, one or more low bandwidth seismic datasets are provided to the machine-learned model as an input. The machine-learned model processes the one or more low bandwidth seismic datasets and produces an output. The output is compared to the associated high bandwidth seismic datasets. During training, the machine-learned model is adjusted such that the output of the machine-learned model, upon receiving one or more low bandwidth seismic datasets, is similar to the associated high bandwidth seismic datasets. Once the machine-learned model is trained, in Block 912, the low bandwidth seismic datasets of the validation set are processed by the trained machine-learned model and its output is compared to the high bandwidth seismic datasets of the validation set. Thus, the performance of the trained machine-learned model can be evaluated. Block 914 represents a decision. If the trained machine-learned model is found to have suitable performance as evaluated on the validation set, where the criterion for suitable performance is defined by a user, then the trained machine-learned model is accepted for use on new seismic datasets. When the machine-learned model is used on non-synthetic seismic datasets where the use of the machine-learned model boosts the bandwidth of a seismic dataset, the machine-learned model is said to be used in production. In Block 918, the trained machine-learned model is used in production. However, before the machine-learned model is used in production a final indication of its performance can be acquired by estimating the generalization error of the trained machine-learned model, as shown in Block 916. The generalization error is estimated by evaluating the performance of the trained machine-learned model, after a suitable model has been found, on the test set. One with ordinary skill in the art will recognize that the training procedure depicted in FIG. 9 is general and that many adaptions can be made without departing from the scope of the present disclosure. For example, common training techniques, such as early stopping, adaptive or scheduled learning rates, and cross-validation may be used during training without departing from the scope of this disclosure.

Figure 10A:
FIG. 10A depicts a low bandwidth seismic dataset in accordance with one or more embodiments.
Figure 10B:
FIG. 10B depicts a high bandwidth seismic dataset in accordance with one or more embodiments.
Figure 10C:
FIG. 10C depicts an extended bandwidth seismic dataset as produced by a machine-learned model in accordance with one or more embodiments.

FIG. 10A and FIG. 10B depict a low bandwidth seismic dataset and accompanying high bandwidth seismic dataset of a synthetic dataset, respectively. This synthetic dataset, along with others, can be used to train, validate, or test the machine-learned model. FIG. 10C depicts the result of a trained machine-learned model when accepting, as an input, the low bandwidth seismic dataset of FIG. 10A. As seen, the output of the trained machine-learned model (FIG. 10C) is an extended seismic dataset where the extended seismic dataset closely resembles the desired high bandwidth seismic dataset (FIG. 10B).

Figure 11:
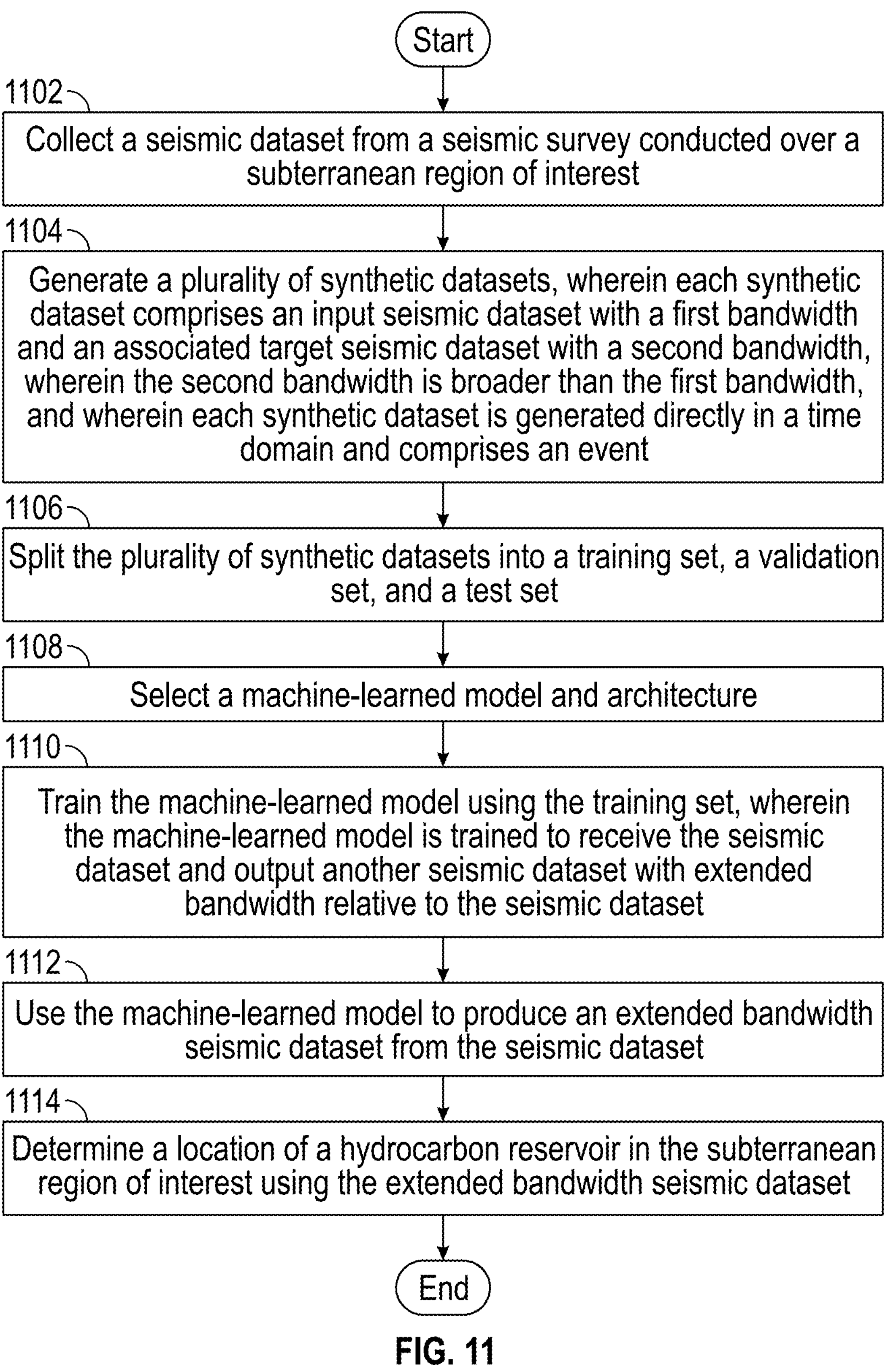
FIG. 11 depicts a flowchart in accordance with one or more embodiments.

FIG. 11 depicts a flowchart outlining the process of training and using a machine-learned model to extend the bandwidth of one or more seismic datasets. In Block 1102, a seismic dataset is collected from a seismic survey conducted over a subterranean region of interest (102). The seismic dataset may resemble that shown in FIG. 2. That is, the seismic dataset is a collection of traces, where each trace records the amplitude of ground-motion at a sequence of discrete sample times. It is noted that once acquired, a seismic dataset may undergo a myriad of pre-processing steps. One with ordinary skill in the art will recognize that zero or more pre-processing (or processing) steps may be applied with the methods disclosed herein without imposing a limitation on the instant disclosure. In Block 1104, a plurality of synthetic datasets is generated. Each synthetic dataset includes a low bandwidth seismic dataset and an accompanying high bandwidth seismic dataset. To be precise, the low bandwidth seismic dataset is referred to as the input seismic dataset where the input seismic dataset has a first bandwidth. Likewise, the high bandwidth seismic dataset is referred to as the target seismic dataset and the target seismic dataset has a second bandwidth. The second bandwidth is broader than the first bandwidth as the second bandwidth spans the entirety of the first bandwidth and contains higher frequencies than those present in the first bandwidth. Thus, each synthetic dataset has an input-target pair that may be used for training the machine-learned model. Further, each synthetic seismic dataset is generated directly in the time domain and does not make use of a forward modeling process. Each seismic dataset has one or more events in the time domain. Each event of a seismic dataset has an associated geometric shape (e.g., a linear line). Further each event is convolved with a wavelet. The width of the wavelet(s) used in the target seismic datasets is narrower than the width used in the associated input seismic datasets. Because each event is convolved with a wavelet, it may be said that each event can be defined (or includes) both a geometric shape and a wavelet. The relative widths of wavelets used in the input and target seismic datasets of the synthetic datasets can be tailored to boost (or extend) the bandwidth of the target seismic datasets relative to the input seismic datasets. The boost may be described by the ratio the peak frequency observed in the target (i.e., high bandwidth) seismic datasets over the peak frequency of the input (i.e., low bandwidth) seismic datasets.

In Block 1106, the plurality of synthetic seismic datasets is split into a training set, validation set, and a test set. In one or more embodiments, the validation set and the test set are the same. In Block 1108, a machine-learned model type and associated architecture are selected. In Block 1110, the machine-learned model is trained using, at least, the training set. The machine-learned model is configured to receive the seismic dataset and output another seismic dataset with extended bandwidth relative to the received seismic dataset. It is noted that Blocks 1108 and 1110 may be implemented iteratively such that many different machine-learned model types and architectures may be explored, trained, and evaluated until a suitable or best model is found. In Block 1112, the trained machine-learned model is used to process the seismic dataset and produce an extended bandwidth seismic dataset. In Block 1114, the extended bandwidth seismic dataset is used, at least in part, to determine one or more geological features of the subterranean region of interest (102) and to determine the location of a hydrocarbon reservoir (104) in the subterranean region of interest (102). For example, the extended bandwidth seismic dataset enables the interpretation of subtle geological features and thin geological units in the subterranean region of interest (102). Further, the extended bandwidth seismic dataset may be used to construct subsurface models of the subterranean region of interest (102). For example, the extended bandwidth seismic dataset may be used to characterize and locate hydrocarbon reservoirs (104) and may be used to plan and drill a wellbore to extract said hydrocarbons. Additional information regarding drilling a wellbore will be provided later in the instant disclosure. Further, the extended bandwidth seismic dataset and the subsurface models can inform oil and gas field planning and lifecycle management decisions. It is emphasized that the quality of subsurface models, efforts to locate hydrocarbons, and well management decisions are all improved when using the extended bandwidth seismic dataset produced by the trained machine-learned model as opposed to the original seismic dataset.

As a concrete example of the methods, processes, models, and techniques described herein, a plurality of synthetic datasets was generated, a machine-learned model was trained, and the results of the machine-learned model were evaluated on both artificial and real seismic datasets. These results will be shown in FIGS. 12-15 with an accompanying discussion herein. For the following examples, 9000 synthetic datasets were generated using the processes described in FIG. 7. The synthetic datasets each consist of a low bandwidth seismic dataset and an associated high bandwidth seismic dataset. For the following examples, the time domain of the synthetic datasets consists of 256 traces each with 256 discrete time samples. The spacing, in time, between the time samples was set to 4 ms. It is emphasized that no forward modeling process is used to generate the synthetic datasets. Rather, each synthetic dataset is generated using a large number of geometric shapes. That is, each synthetic dataset is created using a varying number of events, which can have any shape, for example, but not limited to, linear and hyperbolic shapes. Further, the synthetic events can be modelled with any kind of wavelet, such as for example, but not limited to, Ricker or Gaussian wavelets. For the present example, the wavelets of the synthetic datasets were given a random amplitude and random perturbations such as statics, amplitude variations, and random noise were applied to the synthetic datasets. A machine-learned model after the architecture shown in FIG. 5 was selected and trained, where 500 of the 9000 synthetic datasets were set aside as a validation/testing set. The machine-learned model was trained using 8500 synthetic datasets. FIGS. 12-15 depict applications and results of the trained machine-learned model.

Figure 12:
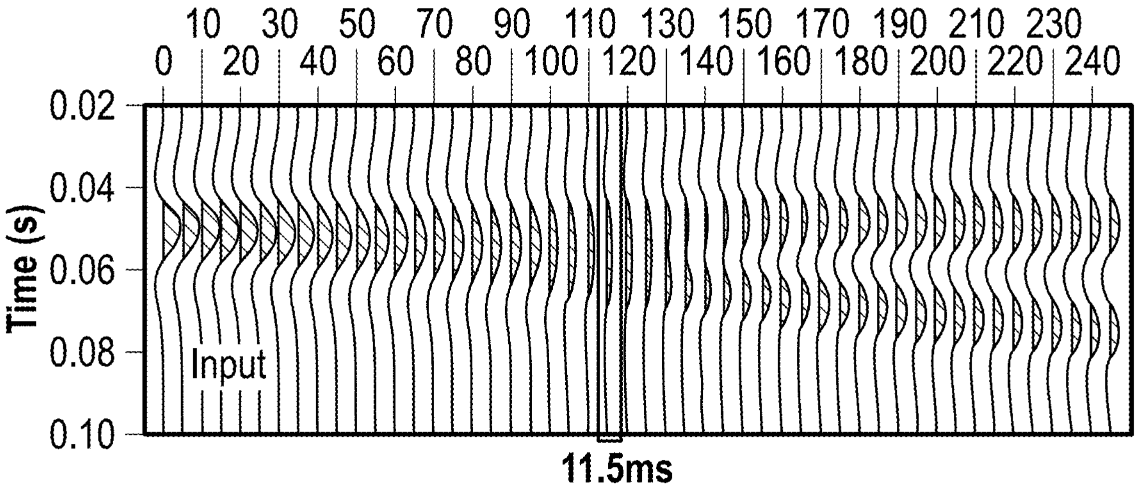
FIG. 12 depicts an artificial seismic dataset of a subsurface wedge and the resulting extended bandwidth seismic datasets upon being processed by a machine-learned model in accordance with one or more embodiments.
Figure 12:
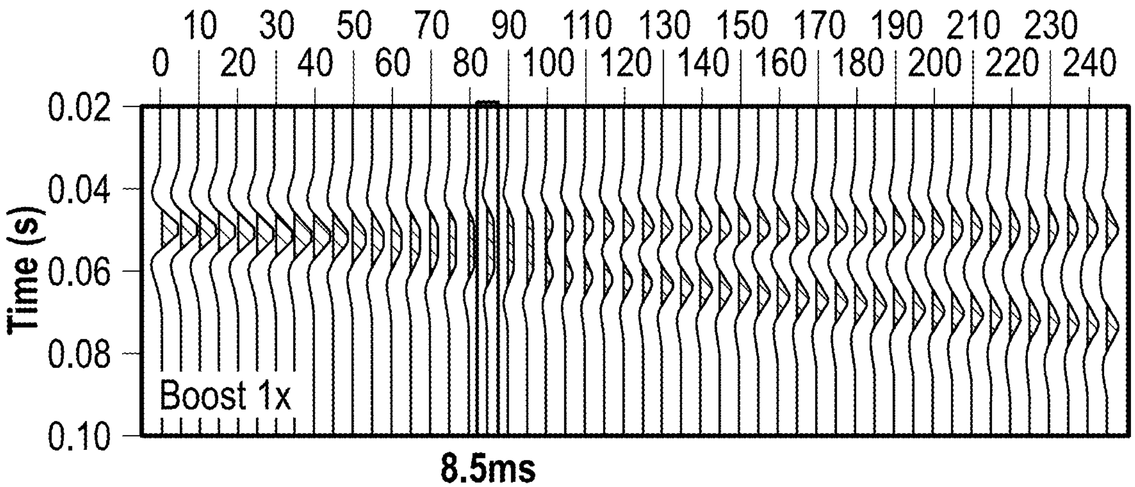
Figure 12:
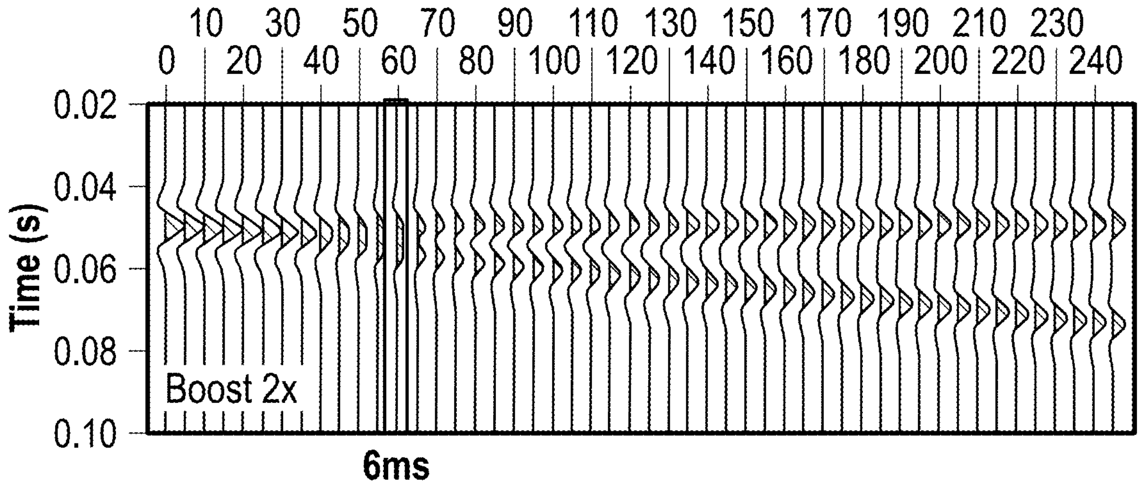

FIG. 12 depicts an example of a wedge model with identical reflection coefficients at the top and base of the wedge, which is a standard test for resolution enhancement. The input data, shown in the top pane of FIG. 12, was made with a 30 Hz Ricker wavelet. In total, there are 50 traces in the input time domain and the wedge is 25 ms thick on the right-hand side of the model. The thickness of the wedge is reduced by 0.5 ms per trace from the rightmost trace to the leftmost trace. As seen in the top pane, when the traces are convolved with the 30 Hz Ricker wavelet, the top and base of the wedge are separable up to a wedge thickness of 11.5 ms. For the present example, the machine-learned model was trained to boost the frequency content by a factor 1.5. After a single application of the machine-learned model the dominant frequency was boosted from 30 Hz to 45 Hz. The resulting extended bandwidth seismic dataset is shown in the middle pane of FIG. 12. The middle pane is labelled as "boost 1×" indicating that the input seismic dataset of the top pane has been processed by, and therefore boosted by, the machine-learned model a single time. As shown in the middle pane of FIG. 12, the result of the single boosting is that the separation between the two wavelets has been reduced from 11.5 ms in the original (top pane) to 8.5 ms (middle pane). Because the input and the output of the machine-learned model have similar structure (i.e., a data array), the output of the machine-learned model can be provided to the machine-learned model as an input for further processing and bandwidth extension. That is, the machine-learned model can process and boost a seismic dataset multiple times. In the present example, where the machine-learned model has been trained to boost the frequency content by a factor of 1.5, a double application of the machine-learned model would boost the frequency content of a seismic dataset by a factor $1.5^2=2.25$ (e.g., 30 Hz to 67.5 Hz). The bottom pane of FIG. 12 depicts the resulting extended seismic dataset when the machine-learned model processes the input (top pane) twice (or "boost 2×"). As seen in the bottom pane of FIG. 12, detection of the separation between the top and bottom of the wedge has been reduced from a wedge thickness of 11.5 ms in the original (top pane) to 6 ms (bottom pane).

Figure 13:
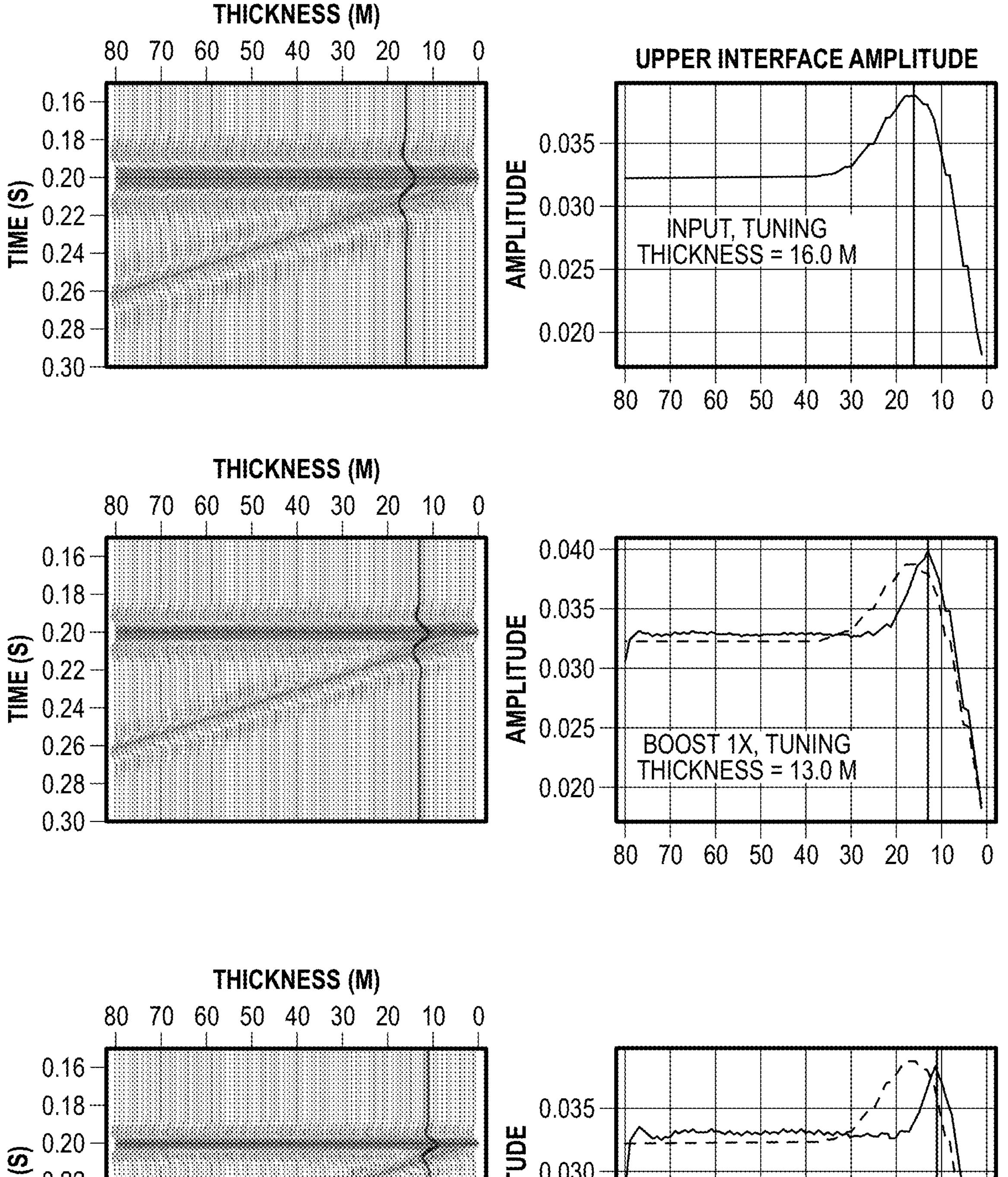
FIG. 13 depicts an another artificial seismic dataset of a subsurface wedge and the resulting extended bandwidth seismic datasets upon being processed by a machine-learned model in accordance with one or more embodiments.

FIG. 13 shows an example of a wedge model with positive and (+0.032) and negative (−0.015) reflection coefficients at the top and base of the wedge, respectively. This example is a standard example for wavelet tuning analysis. The interference of the peak of the wavelet at the top reflection with the sidelobe of the base reflection leads to change of the amplitude of the top wavelet. This is shown in the right-hand side column in FIG. 13. The location of the maximum amplitude along this curve is called the tuning thickness and is a measure of separability. In this example the wedge thickness is specified in meters (depth instead of time), and the vertical axis for all the plots in the left-hand column of FIG. 13 are computed from the layer thickness and velocities. The wedge thickness decreases from 80 m on the left-hand side to 0 m of the right-hand side, at a rate of 1 meter per trace. The input data, shown in the top left pane, is again made with a 30 Hz Ricker wavelet and the tuning thickness is found to be 16 m. After single and double application of the machine-learned model (i.e., boost 1× and boost 2×) described above and used in the previous example of FIG. 12, the tuning thickness is decreased to 13 m and 11 m, respectively. The thick black trace in the plots in the left-hand column indicates the trace where the amplitude of the top event has a maximum amplitude and corresponds to the tuning thickness location. The plots in the right-hand column show the amplitude extracted along the top event in the corresponding plot in the left-hand column on the same row. The thin red curve in the middle and bottom panes in the right-hand column plots indicates the maximum amplitude of the top event in the input data. The top event is a constant amplitude event and any deviation from constant amplitude in the input data is due to wavelet interference. In the output data, or the middle and bottom panes, additionally a small edge effect and a 2% amplitude distortion of the amplitude are observed. More importantly, the number of traces where the amplitude is approximately constant has increased.

It is noted that in real seismic data the temporal frequency bandwidth is not stationary or constant for all events. Due to absorption of the wave energy in the subsurface, the frequency content is reduced with two-way travel time and the frequency bandwidth of later primary reflection arrivals is always less than that of earlier arrivals. In the case of marine seismic acquisition, multiple reverberations travelling in the water layer will show broader bandwidth than subsurface reflections with the same arrival time, since the former experience much less absorption than the latter. Therefore, if one desires to modify the temporal frequency content of the seismic data via spectral shaping, such a process would require designing different shaping filters for different times and separate events such as primaries and multiples prior to bandwidth enhancement. This is due to the fact that a shaping filter transforms a given input spectrum to a given output spectrum by multiplying the amplitude at each frequency in the input data such that it becomes the desired value. To deal with time-varying spectral bandwidth, time-varying filtering is performed by defining overlapping windows in which different filters are applied.

Figure 14A:
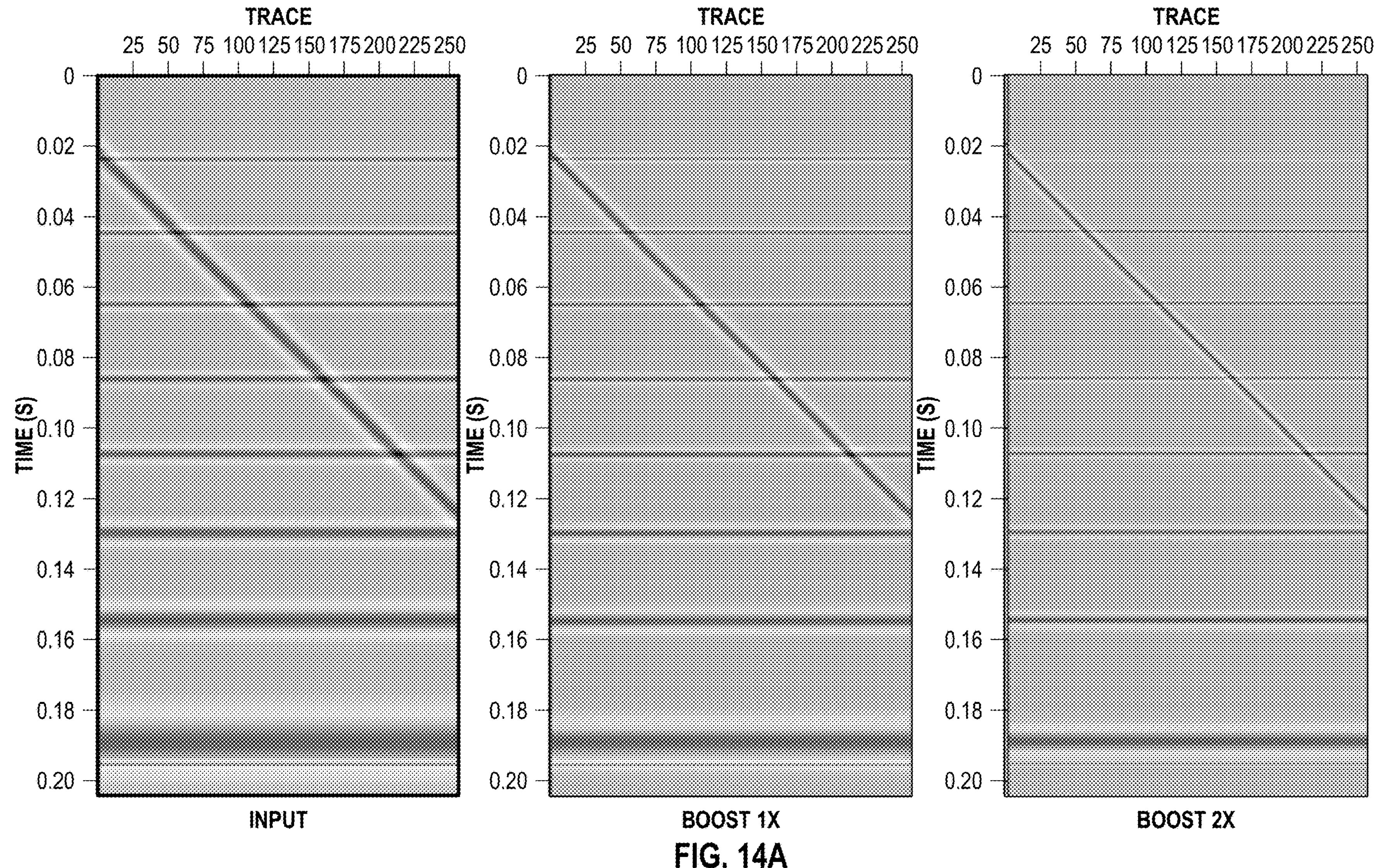
FIG. 14A depicts an artificial seismic dataset of multiple events and the resulting extended bandwidth seismic datasets upon being processed by a machine-learned model in accordance with one or more embodiments.

With the methods disclosed herein, the machine-learned model can be applied to any kind of seismic data, whether it has a constant bandwidth or a time-varying bandwidth. The machine-learned model will boost the peak frequency of the wavelet in the seismic dataset by the factor set during training (e.g., a factor 1.5 in the previous examples). This even happens when a low-bandwidth and a high-bandwidth event occur in the same vicinity, interfere, or overlap. Such an application is not feasible with conventional shaping filters, even with time-varying filtering because shaping filters are derived for a particular input-output pair of spectra. As such, embodiments disclosed herein are advantageous over currently employed methods in the literature. FIG. 14A, in the leftmost pane, shows a synthetic seismic dataset with events with non-stationary wavelets, simulating a seismic section with time-varying spectral content. Again, the machine-learned model described in the previous examples was applied to the input (FIG. 14A, left pane) to boost the frequency content one time and two times. The results of the boosting are shown in the middle (boost 1×) and the right (boost 2×) panes of FIG. 14A. All wavelets have their peak frequency boosted by a factor 1.5 and by a factor $1.5^2=2.25$ for the boost 1× and boost 2× cases, respectively. As seen in the input seismic dataset and the boosted results (FIG. 14A), in the seismic datasets there are eight horizontal events and one dipping event. The horizontal events can be labelled from top to bottom as event 1, event 2, etc. Each event was modelled with a constant Ricker wavelet.

Figure 14B:
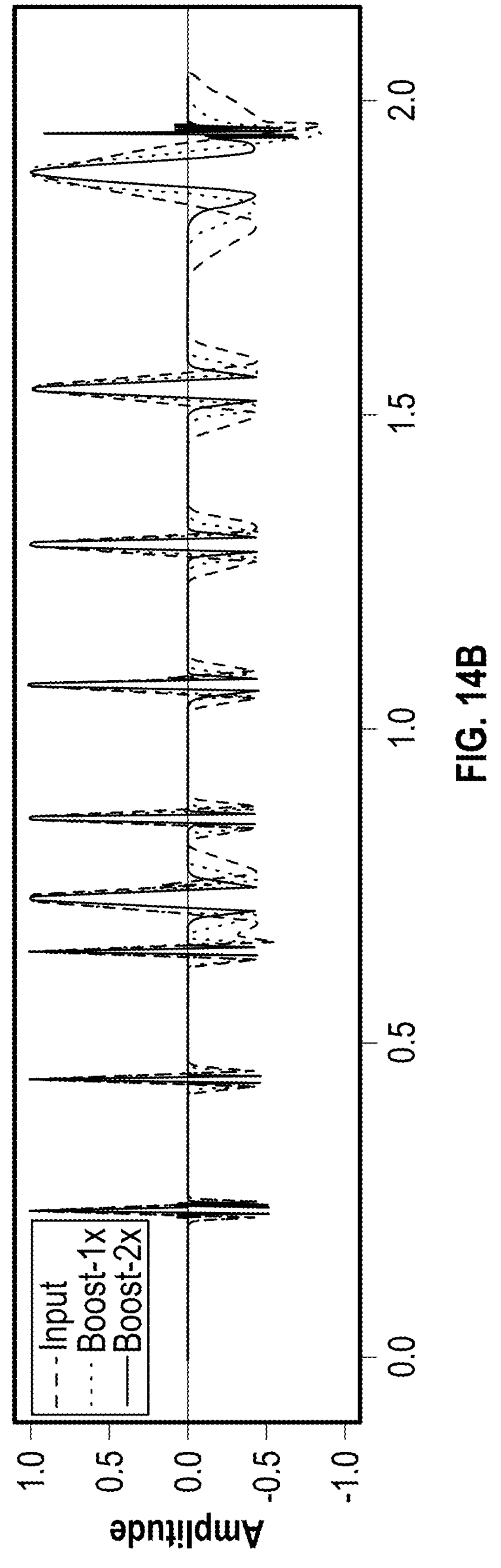
FIG. 14B depicts center traces for the panes of FIG. 14A.

FIG. 14B depicts the central trace of each of the seismic datasets shown in FIG. 14A. As seen, in FIG. 14B, the trace of the input seismic dataset demonstrates that the wavelets are non-stationary and have time-varying spectral content. Also depicted in FIG. 14B, in the traces of the boost 1× seismic dataset (FIG. 14A, middle pane) and the boost 2× seismic dataset (FIG. 14A, right pane), the widths of the wavelets are decreased, demonstrating an extension of bandwidth, despite the non-stationary nature of the wavelet at each event.

Using EQs. 4 and 5 that define the relationship between the width of a Ricker wavelet and peak frequency (depicted in FIGS. 8A and 8B), the peak frequency of the wavelets shown in FIG. 14B can be calculated. Further, the peak frequency of a wavelet after the seismic dataset has been boosted (or boosted multiple times) can be compared to the peak frequency of the wavelet in the input seismic dataset to determine the actual boost factor. The calculated peak frequencies and boosting factors of the events in the seismic datasets shown in FIG. 14A are tabulated in Table I. In Table I, both the peak frequency used for modeling, as well as the peak frequency inferred from the measurement of time or depth between the main lobe zero-crossings $T_r$ are shown for the input (original) seismic dataset. The expected boosting factor (ratio) for the boost 1× case is 1.5 and the expected factor for the boost 2× case is 2.25. As seen in Table I, the observed boosting factors match very well with the expected factors.

TABLE I

Peak frequencies of the events in FIG. 14A.

| Horizontal event | Modelled $f_M$ Input (Hz) | Measured $f_M$ Input (Hz) | Measured $f_M$ Boost 1x (Hz) | Measured $f_M$ Boost 2x (Hz) | Ratio Boost 1x/ input | Ratio Boost 2x/ input | Ratio Boost 2x/ Boost 1x |
|---|---|---|---|---|---|---|---|
| 1 | 37.0 | 37.0 | 54.7 | 74.8 | 1.48 | 2.02 | 1.37 |
| 2 | 32.4 | 32.3 | 47.5 | 69.6 | 1.47 | 2.15 | 1.47 |
| 3 | 27.8 | 27.8 | 41.1 | 61.8 | 1.48 | 2.23 | 1.51 |
| 4 | 23.2 | 25.5 | 34.7 | 50.1 | 1.36 | 1.97 | 1.44 |
| 5 | 18.5 | 18.5 | 27.7 | 41.2 | 1.50 | 2.23 | 1.49 |
| 6 | 13.9 | 13.9 | 20.5 | 30.7 | 1.48 | 2.21 | 1.50 |
| 7 | 9.3 | 9.3 | 13.8 | 20.6 | 1.49 | 2.22 | 1.49 |
| 8 | 4.6 | 4.6 | 6.9 | 10.5 | 1.50 | 2.27 | 1.51 |
| Dipping event | 9.3 | 9.3 | 14.0 | 21.1 | 1.51 | 2.27 | 1.50 |

Figure 15A:
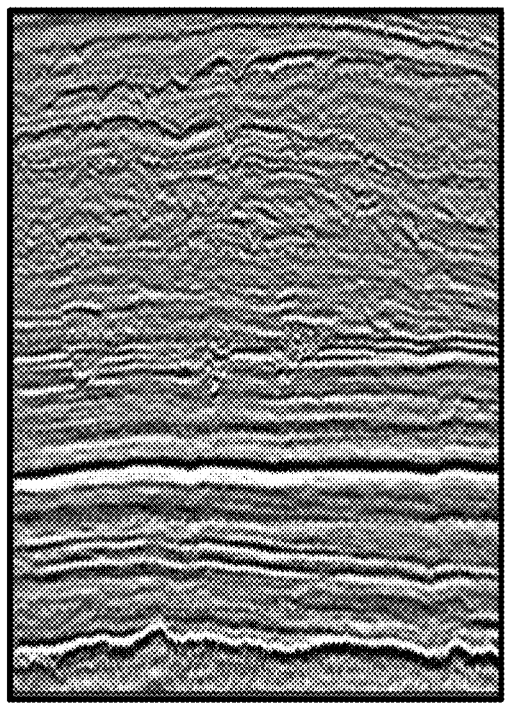
FIG. 15A depicts a real seismic dataset in accordance with one or more embodiments.
Figure 15B:
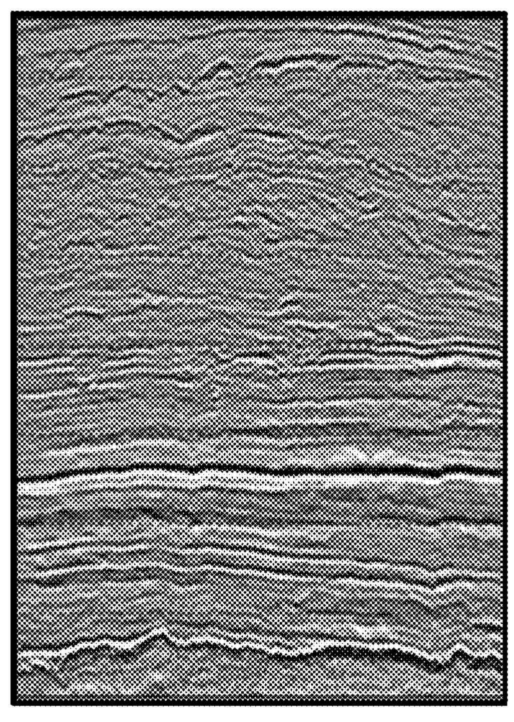
FIG. 15B depicts an extended bandwidth seismic dataset in accordance with one or more embodiments.

Finally, FIG. 15A depicts a real seismic dataset and FIG. 15B depicts the extended bandwidth seismic dataset of FIG. 15A after being processed by the machine-learned model described above. As seen, the geological features are visualized with higher resolution in FIG. 15B.

Figure 16:
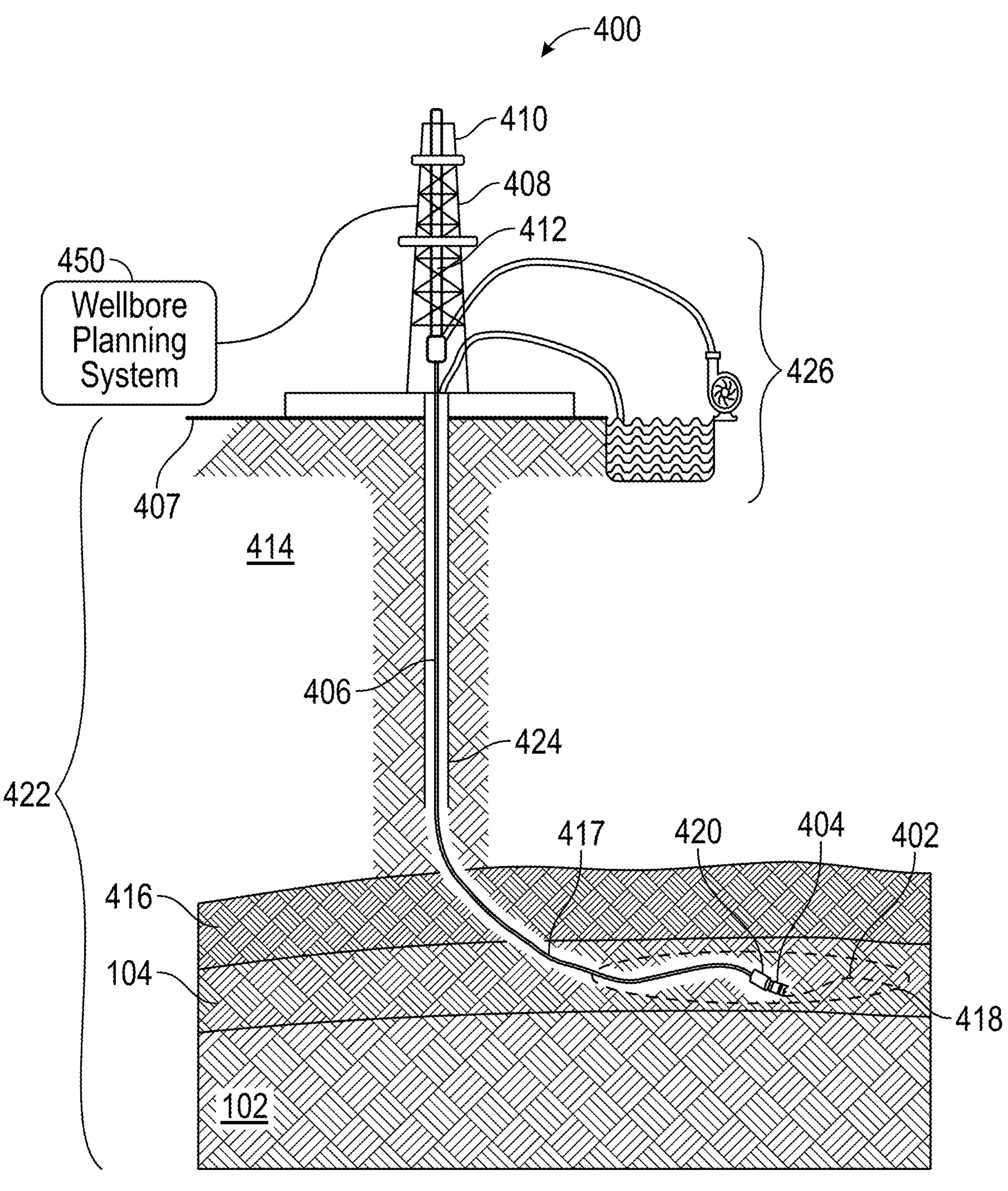
FIG. 16 depicts a drilling system in accordance with one or more embodiments.

FIG. 16 shows a drilling system (1600) in accordance with one or more embodiments. Although the drilling system (1600) shown in FIG. 16 is used to drill a wellbore on land, the drilling system (1600) may also be a marine wellbore drilling system. The example of the drilling system (1600) shown in FIG. 16 is not meant to limit the present disclosure.

As shown in FIG. 16, a wellbore path (1602) may be drilled by a drill bit (1604) attached by a drillstring (1606) to a drill rig located on the surface (1607) of the earth. The drill rig may include framework, such as a derrick (1608) to hold drilling machinery. The top drive (1610) sits at the top of the derrick (1608) and provides clockwise torque via the drive shaft (1612) to the drillstring (1606) in order to drill the wellbore. The wellbore may traverse a plurality of overburden (1614) layers and one or more cap-rock (1616) layers to a hydrocarbon reservoir (104) within the subterranean region of interest (102). In accordance with one or more embodiments, the extended bandwidth seismic dataset may be used to plan a wellbore including a wellbore path (1602), and drill a wellbore (1617) guided by the wellbore path (1602). The wellbore path (1602) may be a curved wellbore path, or a straight wellbore path. All or part of the wellbore path (1602) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the target zone (1618), e.g., a targeted hydrocarbon-bearing formation, and a planned wellbore path (1602) from the starting location to the terminal location. In other words, the wellbore path (1602) may intersect a previously located hydrocarbon reservoir (104).

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. In accordance with one or more embodiments, the wellbore plan is informed by an extended bandwidth seismic dataset produced using the machine-learned model (304) applied to a seismic dataset (302) acquired through a seismic survey (100) conducted over the subterranean region of interest (102).

The wellbore plan may include wellbore geometry information such as wellbore diameter and inclination angle. If casing (1624) is used, the wellbore plan may include casing type or casing depths. Furthermore, the wellbore plan may consider other engineering constraints such as the maximum wellbore curvature ("dog-log") that the drillstring (1606) may tolerate and the maximum torque and drag values that the drilling system (1600) may tolerate.

A wellbore planning system (1650) may be used to generate the wellbore plan. The wellbore planning system (1650) may comprise one or more computer processors in communication with computer memory containing the geophysical and geomechanical models, the extended bandwidth seismic dataset, information relating to drilling hazards, and the constraints imposed by the limitations of the drillstring (1606) and the drilling system (1600). The wellbore planning system (1650) may further include dedicated software to determine the planned wellbore path (1602) and associated drilling parameters, such as the planned wellbore diameter, the location of planned changes of the wellbore diameter, the planned depths at which casing (1624) will be inserted to support the wellbore and to prevent formation fluids entering the wellbore, and the drilling mud weights (densities) and types that may be used during drilling the wellbore.

A wellbore (1617) may be drilled using a drill rig that may be situated on a land drill site, an offshore platform, such as a jack-up rig, a semi-submersible, or a drill ship. The drill rig may be equipped with a hoisting system, such as a derrick (1608), which can raise or lower the drillstring (1606) and other tools required to drill the well. The drillstring (1606) may include one or more drill pipes connected to form conduit and a bottom hole assembly (BHA) (1620) disposed at the distal end of the drillstring (1606). The BHA (1620) may include a drill bit (1604) to cut into subsurface (1622) rock. The BHA (1620) may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore (1617). Both MWD and LWD measurements may be transmitted to the surface (1607) using any suitable telemetry system, such as mud-pulse or wired-drill pipe, known in the art.

To start drilling, or "spudding in" the well, the hoisting system lowers the drillstring (1606) suspended from the derrick (1608) towards the planned surface location of the wellbore (1617). An engine, such as a diesel engine, may be used to supply power to the top drive (1610) to rotate the drillstring (1606). The weight of the drillstring (1606) combined with the rotational motion enables the drill bit (1604) to bore the wellbore.

The near-surface is typically made up of loose or soft sediment or rock, so large diameter casing (1624), e.g., "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (1607) of the earth.

Drilling may continue without any casing (1624) once deeper, or more compact rock is reached. While drilling, a drilling mud system (1626) may pump drilling mud from a mud tank on the surface (1607) through the drill pipe. Drilling mud serves various purposes, including pressure equalization, removal of rock cuttings, or drill bit cooling and lubrication.

At planned depth intervals, drilling may be paused and the drillstring (1606) withdrawn from the wellbore. Sections of casing (1624) may be connected and inserted and cemented into the wellbore. Casing string may be cemented in place by pumping cement and mud, separated by a "cementing plug," from the surface (1607) through the drill pipe. The cementing plug and drilling mud force the cement through the drill pipe and into the annular space between the casing and the wellbore wall. Once the cement cures, drilling may recommence. The drilling process is often performed in several stages. Therefore, the drilling and casing cycle may be repeated more than once, depending on the depth of the wellbore and the pressure on the wellbore walls from surrounding rock.

Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A drilling system (1600) may be disposed at and communicate with other systems in the well environment. The drilling system (1600) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus. Drilling may be considered complete when a target zone (1618) is reached, or the presence of hydrocarbons is established.

Figure 17:
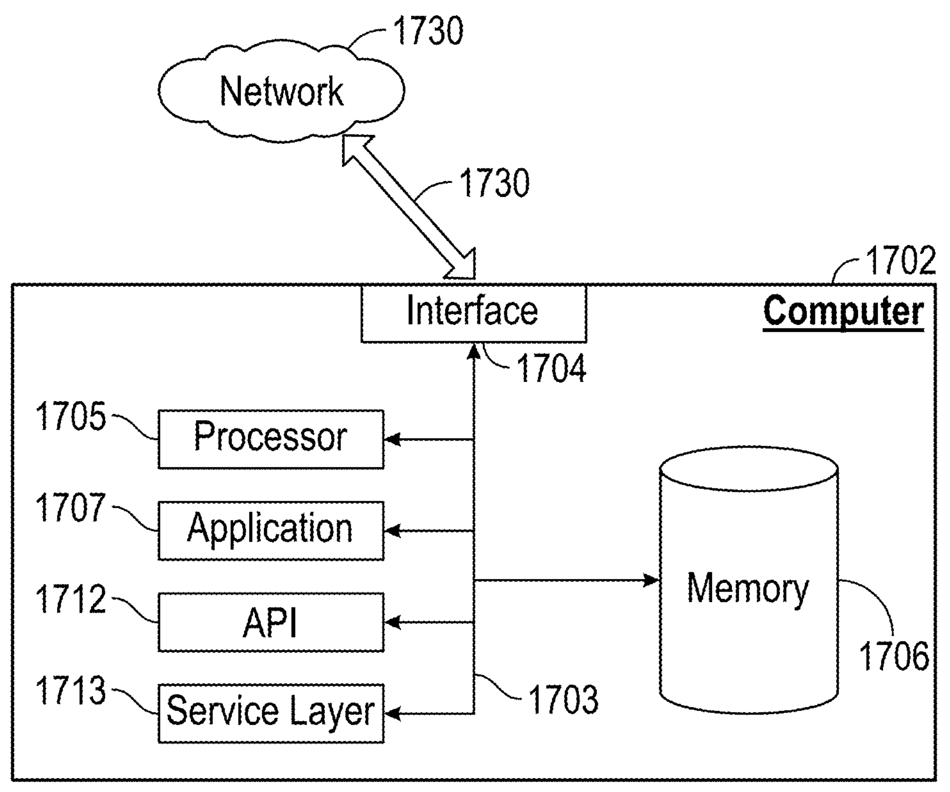
FIG. 17 depicts a system in accordance with one or more embodiments.

FIG. 17 further depicts a block diagram of a computer system (1702) used to provide computational functionalities associated with the methods, functions, processes, flows, and procedures as described in this disclosure, according to one or more embodiments. The illustrated computer (1702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1702) may include a computer that includes an input device, such as a keypad, keyboard, touch screen, or other device that can accept user information, and an output device that conveys information associated with the operation of the computer (1702), including digital data, visual, or audio information (or a combination of information), or a GUI.

The computer (1702) can serve in a role as a client, network component, a server, a database or other persistency, or any other component (or a combination of roles) of a computer system for performing the subject matter described in the instant disclosure. In some implementations, one or more components of the computer (1702) may be configured to operate within environments, including cloud-computing-based, local, global, or other environment (or a combination of environments).

At a high level, the computer (1702) is an electronic computing device operable to receive, transmit, process, store, or manage data and information associated with the described subject matter. According to some implementations, the computer (1702) may also include or be communicably coupled with an application server, e-mail server, web server, caching server, streaming data server, business intelligence (BI) server, or other server (or a combination of servers).

The computer (1702) can receive requests over network (1730) from a client application (for example, executing on another computer (1702) and responding to the received requests by processing the said requests in an appropriate software application. In addition, requests may also be sent to the computer (1702) from internal users (for example, from a command console or by other appropriate access method), external or third-parties, other automated applications, as well as any other appropriate entities, individuals, systems, or computers.

Each of the components of the computer (1702) can communicate using a system bus (1703). In some implementations, any or all of the components of the computer (1702), both hardware or software (or a combination of hardware and software), may interface with each other or the interface (1704) (or a combination of both) over the system bus (1703) using an application programming interface (API) (1712) or a service layer (1713) (or a combination of the API (1712) and service layer (1713). The API (1712) may include specifications for routines, data structures, and object classes. The API (1712) may be either computer-language independent or dependent and refer to a complete interface, a single function, or even a set of APIs. The service layer (1713) provides software services to the computer (1702) or other components (whether or not illustrated) that are communicably coupled to the computer (1702). The functionality of the computer (1702) may be accessible for all service consumers using this service layer. Software services, such as those provided by the service layer (1713), provide reusable, defined business functionalities through a defined interface. For example, the interface may be software written in JAVA, C++, or other suitable language providing data in extensible markup language (XML) format or another suitable format. While illustrated as an integrated component of the computer (1702), alternative implementations may illustrate the API (1712) or the service layer (1713) as stand-alone components in relation to other components of the computer (1702) or other components (whether or not illustrated) that are communicably coupled to the computer (1702). Moreover, any or all parts of the API (1712) or the service layer (1713) may be implemented as child or sub-modules of another software module, enterprise application, or hardware module without departing from the scope of this disclosure.

The computer (1702) includes an interface (1704). Although illustrated as a single interface (1704) in FIG. 17, two or more interfaces (1704) may be used according to particular needs, desires, or particular implementations of the computer (1702). The interface (1704) is used by the computer (1702) for communicating with other systems in a distributed environment that are connected to the network (1730). Generally, the interface (1704) includes logic encoded in software or hardware (or a combination of software and hardware) and operable to communicate with the network (1730). More specifically, the interface (1704) may include software supporting one or more communication protocols associated with communications such that the network (1730) or interface's hardware is operable to communicate physical signals within and outside of the illustrated computer (1702).

The computer (1702) includes at least one computer processor (1705). Although illustrated as a single computer processor (1705) in FIG. 17, two or more processors may be used according to particular needs, desires, or particular implementations of the computer (1702). Generally, the computer processor (1705) executes instructions and manipulates data to perform the operations of the computer (1702) and any algorithms, methods, functions, processes, flows, and procedures as described in the instant disclosure.

The computer (1702) also includes a memory (1706) that holds data for the computer (1702) or other components (or a combination of both) that can be connected to the network (1730). The memory may be a non-transitory computer readable medium. For example, memory (1706) can be a database storing data consistent with this disclosure. Although illustrated as a single memory (1706) in FIG. 17, two or more memories may be used according to particular needs, desires, or particular implementations of the computer (1702) and the described functionality. While memory (1706) is illustrated as an integral component of the computer (1702), in alternative implementations, memory (1706) can be external to the computer (1702).

The application (1707) is an algorithmic software engine providing functionality according to particular needs, desires, or particular implementations of the computer (1702), particularly with respect to functionality described in this disclosure. For example, application (1707) can serve as one or more components, modules, applications, etc. Further, although illustrated as a single application (1707), the application (1707) may be implemented as multiple applications (1707) on the computer (1702). In addition, although illustrated as integral to the computer (1702), in alternative implementations, the application (1707) can be external to the computer (1702).

There may be any number of computers (1702) associated with, or external to, a computer system containing computer (1702), wherein each computer (1702) communicates over network (1730). Further, the term "client," "user," and other appropriate terminology may be used interchangeably as appropriate without departing from the scope of this disclosure. Moreover, this disclosure contemplates that many users may use one computer (1702), or that one user may use multiple computers (1702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:

collecting a seismic dataset from a seismic survey conducted over a subterranean region of interest;

generating a plurality of synthetic datasets, wherein each synthetic dataset comprises an input seismic dataset with a first bandwidth and an associated target seismic dataset with a second bandwidth, wherein the second bandwidth is broader, by extending to higher frequencies, than the first bandwidth, wherein generating a given synthetic dataset of the plurality of synthetic datasets comprises:

obtaining, for the given synthetic dataset, synthetic data generation parameters, initializing a time domain as a collection of traces organized according to a simulated location and aligned along a time axis, each trace initialized with a value of zero or a random value at each time comprised by the time axis, determining, using the synthetic data generation parameters, a number of events to be superimposed into the time domain, for each event:

determining, using the data generation parameters, a geometric shape, shape parameters, and an event location; and superimposing the event into the time domain by altering the value of each trace at each time that intersects the event based on the geometric shape, shape parameters, and event location, selecting, using the data generation parameters, a wavelet and wavelet parameters, duplicating the time domain to form a first time domain and a second time domain, setting the selected wavelet to have a first width and convolving the selected wavelet with the traces of the first time domain to form an input seismic dataset of the given synthetic dataset, and setting the selected wavelet to have a second width and convolving the selected wavelet with the traces of the second time domain to form a target seismic dataset of the given synthetic dataset, wherein the second width is smaller than the first width;

splitting the plurality of synthetic datasets into a training set;

selecting a first machine-learned model with a first architecture;

training the first machine-learned model using the training set, wherein the first machine-learned model is trained to receive the seismic dataset and output another seismic dataset with extended bandwidth relative to the seismic dataset;

using the first machine-learned model to produce an extended bandwidth seismic dataset from the seismic dataset;

determining a location of a hydrocarbon reservoir in the subterranean region of interest using the extended bandwidth seismic dataset;

planning a wellbore to penetrate the hydrocarbon reservoir based on the location, wherein the planned wellbore comprises a planned wellbore path; and drilling the wellbore guided by the planned wellbore path.

2. The method of claim 1, further comprising:

splitting the plurality of synthetic datasets into a validation set;

evaluating the first machine-learned model on the validation set;

selecting a second machine-learned model with a second architecture;

training the second machine-learned model using the training set;

evaluating the second machine-learned model on the validation set; and identifying which machine-learned model, of the first and second machine-learned models, has the best performance as evaluated on the validation set.

3. The method of claim 1, further comprising:

splitting the plurality of synthetic datasets into a test set; and estimating a machine-learned model generalization error using the test set.

4. The method of claim 1, further comprising:

applying an amplitude function to each event in each synthetic dataset;

applying random noise to each synthetic dataset; and applying static perturbations to each synthetic data set.

5. The method of claim 1, wherein the machine-learned model is a convolutional neural network.

6. The method of claim 1, further comprising:

pre-processing the seismic dataset, wherein pre-processing comprises:

regularizing the seismic dataset, and applying a move-out correction to the seismic dataset.

7. The method of claim 1, further comprising:

using the first machine-learned model on the extended bandwidth seismic dataset to produce a double extended bandwidth seismic dataset.

8. The method of claim 1, wherein generating the given synthetic dataset of the plurality of synthetic datasets further comprises:

adding noise to the given synthetic dataset.

9. A system, comprising:

a drilling system configured to drill a wellbore guided by a wellbore plan; and a computer configured to:

receive a seismic dataset, generate a plurality of synthetic datasets, wherein each synthetic dataset comprises an input seismic dataset with a first bandwidth and an associated target seismic dataset with a second bandwidth, wherein the second bandwidth is broader, by extending to higher frequencies, than the first bandwidth wherein generating a given synthetic dataset of the plurality of synthetic datasets comprises:

obtaining, for the given synthetic dataset, synthetic data generation parameters, initializing a time domain as a collection of traces organized according to a simulated location and aligned along a time axis, each trace initialized with a value of zero or a random value at each time comprised by the time axis;

determining, using the synthetic data generation parameters, a number of events to be superimposed into the time domain;

for each event:

determining, using the data generation parameters, a geometric shape, shape parameters, and an event location, and superimposing the event into the time domain by altering the value of each trace at each time that intersects the event based on the geometric shape, shape parameters, and event location;

selecting, using the data generation parameters, a wavelet and wavelet parameters;

duplicating the time domain to form a first time domain and a second time domain;

setting the selected wavelet to have a first width and convolving the selected wavelet with the traces of the first time domain to form an input seismic dataset of the given synthetic dataset; and setting the selected wavelet to have a second width and convolving the selected wavelet with the traces of the second time domain to form a target seismic dataset of the given synthetic dataset, wherein the second width is smaller than the first width, split the plurality of synthetic datasets into a training set, train a machine-learned model using the training set, wherein the machine-learned model is trained to receive the seismic dataset and output another seismic dataset with extended bandwidth relative to the seismic dataset, use the trained machine-learned model to produce an extended bandwidth seismic dataset from the seismic dataset, and construct the wellbore plan using the extended bandwidth seismic dataset.

10. The system of claim 9, wherein the trained machine-learned model is a convolutional neural network.

11. The system of claim 9, wherein the computer is further configured to:

pre-process the seismic dataset, wherein pre-processing comprises:

regularizing the seismic dataset, and applying a move-out correction to the seismic dataset.

* * * * *